US012643135B2

(12) United States Patent
LaChance et al.

(10) Patent No.: US 12,643,135 B2
(45) Date of Patent: Jun. 2, 2026

(54) LOW TEMPERATURE THERMAL TREATMENT

(71) Applicant: TerraTherm, Inc., Bothell, WA (US)

(72) Inventors: John C LaChance, Longmont, CO (US); James P Galligan, Jr., Medway, MA (US); Steffen Griepke Dam Nielsen, Westminster, MA (US); Hillary Danielle Easter, Castleton, VT (US)

(73) Assignee: TERRATHERM, INC., Bothell, WA (US)

( * ) Notice: Subject to any disclaimer, the term of this patent is extended or adjusted under 35 U.S.C. 154(b) by 0 days.

(21) Appl. No.: 18/029,447

(22) PCT Filed: Oct. 6, 2022

(86) PCT No.: PCT/US2022/077709
§ 371 (c)(1),
(2) Date: Mar. 30, 2023

(87) PCT Pub. No.: WO2023/060204
PCT Pub. Date: Apr. 13, 2023

(65) Prior Publication Data
US 2025/0025924 A1      Jan. 23, 2025

(51) Int. Cl.
*B09C 1/06* (2006.01)
*E02D 3/11* (2006.01)

(52) U.S. Cl.
CPC ............... *B09C 1/062* (2013.01); *B09C 1/06* (2013.01); *E02D 3/11* (2013.01)

(58) Field of Classification Search
CPC ... B09C 1/062; B09C 1/06; E02D 3/11; E21B 36/04
See application file for complete search history.

(56) References Cited

U.S. PATENT DOCUMENTS

| | | | | |
|---|---|---|---|---|
| 6,296,815 B1 * | 10/2001 | Walker | ...................... | F23G 7/14 |
| | | | | 422/184.1 |
| 11,642,709 B1 * | 5/2023 | Milan | ..................... | B09C 1/062 |
| | | | | 405/128.15 |
| 2003/0102125 A1 * | 6/2003 | Wellington | ............. | E21B 43/24 |
| | | | | 166/266 |

(Continued)

FOREIGN PATENT DOCUMENTS

| | | | | | |
|---|---|---|---|---|---|
| CN | | 1441709 A | * | 9/2003 | ............... B09C 1/06 |
| CN | | 101163860 A | * | 4/2008 | ............... C10L 3/08 |
| WO | WO-2016068736 A1 | * | 5/2016 | | ............. E02D 1/027 |

*Primary Examiner* — Frederick L Lagman
(74) *Attorney, Agent, or Firm* — Kyle Straughan; Holland & Knight LLP

(57) ABSTRACT

A system for the low-temperature remediation of a target volume comprised of at least one material, the system comprising: one or more heaters, wherein the one or more heaters are configured to connect to a power source and emit heat into their surrounding area at substantially uniform rates and the one or more heaters are at least partially embedded into the target area: a power control and monitoring system configured to deliver voltage and current to the one or more heaters at a substantially uniform rate; and a power source configured to deliver voltage and current to the power control and monitoring system for distribution.

20 Claims, 19 Drawing Sheets

(56)                    References Cited

U.S. PATENT DOCUMENTS

| | | | |
|---|---|---|---|
| 2004/0228690 A1* | 11/2004 | Stegemeier | B09C 1/10 |
| | | | 405/128.45 |
| 2004/0240942 A1* | 12/2004 | Richter | B09C 1/005 |
| | | | 405/128.35 |
| 2014/0133916 A1* | 5/2014 | Baker | B09C 1/06 |
| | | | 405/128.85 |
| 2018/0345338 A1* | 12/2018 | Thomas | F23G 7/14 |

* cited by examiner

LOW TEMPERATURE THERMAL TREATMENT

PRIORITY CLAIM

This application claims priority to and/or the benefit of U.S. provisional patent application Ser. No. 63/262,167 filed Oct. 6, 2021. The foregoing application is incorporated by reference in its entirety as if fully set forth herein.

FIELD OF THE INVENTION

This invention relates generally to systems, devices, and methods for the remediation of organic chemicals in media, including, but not limited to, soil and groundwater through thermally enhanced abiotic and biologically mediated chemical reactions. As noted herein, the invention may also be applied for destruction of invasive species of plants, or insects, or microbes from other media, including, but not limited to, soil, wood chips, or other solid media, either in situ or in a specially constructed ex situ pile or container.

BACKGROUND OF THE INVENTION

As the marketplace shifts towards a greater emphasis on sustainability in response to various issues, including climate change, environmental remediation methods that are able to treat hazardous chemicals or other contaminants without further negatively impacting the surrounding area are increasingly in-demand. There is increasing demand for remediation methods that are sustainable, renewable, and that do not involve further use of chemicals or invasive treatment methods. Many of the chemicals and contaminants that pollute soil and groundwater break down as a result of abiotic and biologically mediated chemical reactions. For example, carbon tetrachloride, a common chlorinated solvent organic chemical, will degrade in the subsurface in the presence of water due to abiotic hydrolysis reaction mechanisms; whereas benzene, toluene, ethylbenzene, and xylenes (BTEX), and petroleum hydrocarbons can be degraded by bacteria in the presence of oxygen. Similarly, certain biological contaminants such as bacteria, plants, algae, insects, or other organisms can be prevented from reproducing or outright destroyed by the alteration of media conditions. As such, the present invention discloses a method that can be used for enhancing both the abiotic and biotic degradation mechanisms as a means for environmental remediation, though the invention's utility is not confined to such tasks.

BRIEF SUMMARY

Specific details of certain embodiments of the invention are set forth in the following description and in the figures to provide a thorough understanding of such embodiments. The present invention may have additional embodiments, may be practiced without one or more of the details described for any particular described embodiment, or may have any detail described for one particular embodiment practiced with any other detail described for another embodiment.

The invention herein comprises the use of one or more low temperature heating devices arranged in a suitable pattern determined by the needs of a target volume of media to use low temperatures between approximately 30 to 100° C. depending on the conditions of the target volume (though not necessarily limited thereto) to remediate contamination in the target volume without causing additional damage to the target volume or causing vaporization or adverse effects resulting from the release of gases or other harmful byproducts of the remediation. In some embodiments, the invention is comprised of one or more electrically powered heaters wherein the heaters are at least partially embedded into the ground at the location of the target volume in, depending on the embodiment, a pattern configured to optimize heat distribution and/or uniformity, or to otherwise ensure adequate remediation of the contaminated area. Where the contaminant is not uniformly distributed in the contaminated area, the heaters may be arranged to address the non-uniformity or in some embodiments moved as part of treatment. The heaters of the invention may be comprised of a variety of mechanisms; certain traditional methods use piping where heated fluids are run through such piping, while other mechanisms may rely on electrical current to generate heat. In some embodiments of the invention, the heaters are comprised of rods and/or wires with a heat transmissive outer shell wherein an electrical wire is run into the rod and/or wires and then out again, with the wire made of a material configured to provide some electrical resistance and generate an embodiment-appropriate amount of heat. This heat then radiates into the target volume at temperatures based on the needs of the embodiment, typically, but not exclusively, between approximately 30-100° C. The invention may be powered in a variety of ways, whether through a local power grid or source, or through alternative sources such as, but not limited to, one or more solar panels affixed to structures such as, but not limited to, to homes and/or businesses that may be near the remediation site.

As described herein, the approach to remediation that consists of low temperature heating has benefits in both biological and abiotic degradation. For example, for aerobic and anerobic biodegradation, increasing the temperature to approximately 30° C. to 40° C. (depending on conditions) can increase biological reaction rates three to four times, which can reduce biologically mediated cleanup times and degradation times by similar factors. In other situations, higher or lower temperatures may be used for various other biodegradation mechanisms depending on the contaminants being treated. Similarly, for abiotic remediation, such as hydrolysis (or using similar chemically reactive methods), increasing the treatment temperature to between approximately 60° C. to 90° C. (depending on conditions) can substantially increase the abiotic reaction rate. For example, in the case of carbon tetrachloride, its hydrolysis half-life at 20° C. is 110,000 days, whereas at 90° C., the hydrolysis half-life is reduced to approximately 3 days. The present disclosure is not limited to hydrolysis however, and can function with other abiotic chemical reactions. Examples of other chemically reactive methods that can be thermally enhanced using the invention include, but are not limited to: dehalogenation, zerovalent iron (ZVI, all forms colloidal and otherwise), in situ chemical oxidation (e.g., heat activated persulfate), and in situ chemical reduction (ISCR).

An additional advantage of the invention Low Temperature Thermal Treatment (LTTT) disclosed herein, is that by limiting heating to temperatures to less than approximately 100° C. to destroy contaminants, including, but not limited to, organic chemicals in situ, water isn't removed from the soil by boiling and steam generation, which eliminates concerns associated with (1) vaporization or volatilization of contaminants resulting in fugitive vapor emissions and (2) potential subsidence and adverse impacts to buildings and structures due to decreases in pore pressures and consolidation of soils, and can reduce the likelihood of incidences of surface collapse or the creation of sinkholes. In addition, the reduced impact on the subsurface, including the reduced subsidence, allows the invention to be practiced even in populated areas, including urban ones, as the method is unlikely to damage nearby structures and/or infrastructure. Furthermore, the operational temperatures of the LTTT heaters are sufficiently low to prevent unwanted oxidation (combustion) of high organic soils such as peats or meadow matt and the associated risk of subsidence due to compaction. The low operating temperatures of the LTTT heaters and absence of active vapor extraction and associated air movement in the subsurface, can also eliminate concerns associated with the uncontrolled in situ combustion of non-aqueous phase liquids (NAPL) such as petroleum hydrocarbons, creosote, and coal tar. Such scenarios can also lead to subsidence due to compaction if large volumes of NAPL exist and are removed as a result of in situ combustion. The lower temperatures used in the disclosed invention also result in less wear and damage to the equipment used, resulting in lower maintenance and equipment costs.

Another common problem faced in the art is consistency of heating, which can be a result of a power supply that is reliant on solar or other periodic energy sources, inconsistent power supplies resulting from degraded infrastructure, or other problems with the power source; or can result from the nature of the heating itself, with some heating mechanisms, such as fluidic, losing substantial amounts of heat within the heating pipeline leading to inconsistently heated areas, and substantial loss of heat at the furthest ends of any piping involved. Due to the nature of the present invention, such issues are resolved. By utilizing electrical heating, and in some embodiments combining it with effective batteries or non-periodic power systems, the heating can remain substantially uniform across long periods of time, allowing for consistent heating. That said, in some embodiments it can be desirable to modulate the heating over time, allowing some or all of the heaters to deactivate during certain time periods to maintain the targeted temperature without exceeding it to facilitate the remediation process. Some embodiments of the present invention may utilize a plurality of heating methods or sources to power heaters in order to ensure consistent power generation.

While described in the context of soil and groundwater, the above method may have application in other media, including, but not limited to, fluidic, porous, semi-solid, and solid media as a means of remediation or modification thereof, and the present disclosure should not be read as limited to soil and groundwater as the sole circumstance in which the present invention could be employed. The present invention may also be employed in other circumstances outside of those in which organic chemical remediation reactions are being enhanced, and should not be read as limited to those specific circumstances, and could be used for other biological or chemical remediation. For example, an alternative use of the invention is the eradication of invasive or undesirable plant species such as Japanese Knotweed. It has been shown that heating the root zone and soil (typically, but not exclusively, 1 to 2 m below ground surface (bgs)), of an area infested with Japanese Knotweed to temperatures in the range of approximately 60° C. to 80° C. for several days will kill the plant and prevent new growth. Alternatively, the invention could be used in an ex situ capacity to heat and sterilize soil and/or other materials placed in a specially constructed above ground pile or container. An example of this type of application could be heating wood chips and lumber to kill unwanted microbes, insects, or plants such that the wood chips can be exported to other regions or countries without risk of introducing invasive flora or fauna. Heating wood chips and lumber to temperatures ranging from approximately 46 to 70° C. for a period of approximately 1 to 4 hours has been shown to kill insect infestations. In some embodiments it may also be desirable or preferable to heat a material ex situ and then repeat the process once it is installed on site to prevent new contamination.

Furthermore, the present invention is not exclusive of other treatment options, and in fact is capable of being configured to operate in tandem and/or as a supplement to or with one or more additional treatment methods of various natures. For example, the present invention can be employed with, but is not limited to, injection-based remediation technologies such as In Situ Chemical Oxidation, In Situ Chemical Reduction, zerovalent iron (ZVI), and other enhanced biological approaches such as Enhanced Reductive Dechlorination, but can also work with other approaches. In the foregoing examples of approaches that rely on abiotic and/or biotic chemical reactions, said reactions degrade and/or destroy the organic compounds. In many cases, though not all, the increased temperature provided by the present invention can enhance the effectiveness, efficiency, and speed of the methods and thereby reduce their cost and timeframe, among other benefits. In some embodiments, the present invention can be combined with an existing remediation technology where each is optimal for treating a different contaminant as a means of treating multiple contaminants; due to the reduced temperature of the present method, the present invention is unlikely to interfere with the other remediation methods.

The use of, in some embodiments, electrically powered heaters and thermal conduction heating to gently heat sites impacted with organic chemicals provides the following advantages over traditional remediation methods, though the following is not a comprehensive list and there may be other benefits as well: 1) the heaters can be simply, rapidly, and inexpensively installed to desired depths using mobile and small track-mounted direct-push technology, 2) all components can be easily installed below grade, thereby allowing unencumbered access and use of the site during the remediation process, 3) gently heating to temperatures less than approximately 100° C. does not generate steam and therefore removes the need for expensive extraction and treatment systems and operating and maintenance labor associated with such systems, 4) once installed and operating, the system can be monitored remotely, so very minimal operations and maintenance is required, 5) natural biotic and abiotic process are utilized and enhanced by the heating to degrade the chemicals and remediate the site in situ, so no excavation, trucking, and disposal of contaminated material is required, 6) sites are frequently safely cleaned with minimal risk to workers and the public, and 7) the reliance on low impact and gentle heating to enhance naturally occurring biotic and abiotic reactions significantly reduces the consumption of natural resources (steel, copper, concrete, equipment, fuel, chemicals, energy, etc.) and the associated $CO_2$ footprint associated with remediating soil and groundwater contaminated by organic chemicals.

One embodiment of the present invention is constructed of small diameter heating elements installed in small diameter piping (i.e., the heater casing) which may be constructed of carbon steel, stainless steel, fiberglass, or other suitable material(s). The elements themselves may consist of commercially available heating cables or tapes, or custom-designed and fabricated insulated electrical heaters, as determined by project requirements, suspended directly in a heater casing or spirally wound around a central support rod and lowered into the heater casing, depending on the depth, power output capacity (e.g., watts per ft) of the heater element, and the desired power output for a particular site. The heating element may also be directly buried or grouted in a borehole (i.e., using no pipe or heater casing). In other configurations, the cables or tapes could be affixed to a central support rod, such as, but not limited to, aligned vertically along the borehole, wrapped in a helical pattern, or affixed in a mesh or net pattern. Such elements could be metallic in nature, comprised of composites or other media capable of producing and conducting heat due to electrical current flow, or a combination of several components depending on the needs of the embodiment and implementation. The exact size of the heating elements can vary depending on the nature of the project and area to be treated, with wider, thicker, or longer elements utilized as necessary. The presently disclosed mechanism may also be employed in shallow horizontal slit trenches or boreholes to address shallow soil contamination or invasive species infestation, or may be applied at significant depths, depending on the depth of the contamination.

Notable is that some embodiments of the invention may be comprised of other components in addition to the heaters, including, but not limited to, temperature probes inserted into the ground and configured to track the temperature of various locations in the remediation area; fluid collectors configured to collect vapor or other fluids should the heaters cause them; or air intakes configured to bring air into the target volume or allow it to leave.

BRIEF DESCRIPTION OF THE DRAWINGS

Embodiments of the present invention are described in detail below with reference to the following drawings.

DETAILED DESCRIPTION

Figure 1:
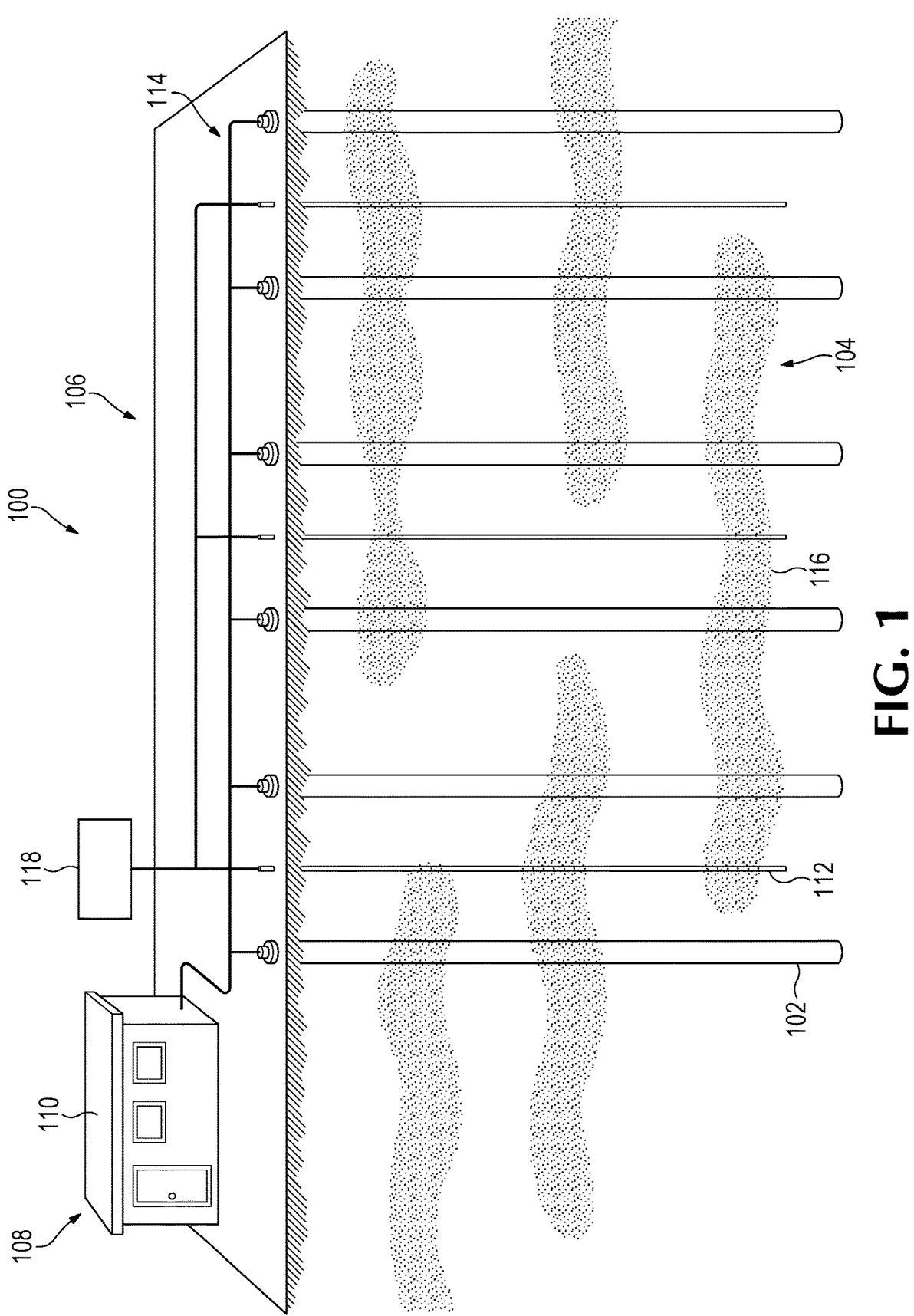
FIG. 1 depicts a side view of a low temperature thermal treatment system in accordance with an embodiment of the invention.

The present invention comprises a system and method for the remediation of target volumes using low temperature thermal treatment ("LTTT") which is achieved by, in some embodiments, inserting one or more heaters into a target volume and heating it to temperatures below approximately 100° C. The heaters, when electric, may be powered by a variety of means including, but not limited to, solar, hydro-electric, or by connecting the heaters to a local power grid. Depending on the needs of the volume, site, and/or embodiment, the heaters may be arranged in a variety of configurations, where some may be partially or fully embedded into the target volume, while others may be buried in the target volume, with the end result configured to meet the needs of the volume, site, and/or embodiment. The system may also incorporate one or more temperature probes configured to ensure that the heaters do not exceed a certain temperature in a certain area, or to otherwise track the heating in the target volume. Some embodiments of the invention may further involve periods of heating and cooling, with the heaters deactivating temporarily or being configured to be unable to exceed certain temperatures, such as approximately 100° C. for some embodiments. The heaters used in the invention may be comprised of a number of different materials and take a variety of shapes, with some embodiments also featuring multiple types or configurations of heaters. According to some embodiments, the invention may further feature a control system configured to be controlled by an input, which may be a remote controller, and a system for outputting information, which may then be reviewed by a user.

The invention herein achieves significant enhancements in the degradation rates of the organic chemicals at temperatures below the boiling point of water, typically 100° C. depending on factors such as altitude and surface pressure. For example, abiotic degradation mechanisms can be significantly enhanced by using temperatures in the range of approximately 70 to 90° C. and biotic degradation mechanisms can be enhanced by increasing the temperature to approximately 30 to 40° C. Heating the contents of the media, such as, but not limited to, soil and water, to temperatures less than 100° C. can prevent the formation of steam and the rapid volatilization of the organic chemicals in the subsurface, which then have to be captured, extracted and treated. Depending on the circumstances, the exact temperature ceiling may vary depending on local atmospheric pressure, while generally speaking 100° C. would apply to sea-level at ordinary atmospheric conditions, while in some cases the heaters may go above or below 100° C. as necessary. As an alternative to removing the chemicals from the subsurface by volatilization, the invention removes them through thermally enhancing in-situ biotic and abiotic degradation and destruction mechanisms. Thus, the invention substantially reduces or eliminates the need for complex and expensive extraction and treatment systems typically used at thermal remediation sites or volumes where the target temperature for heating the impacted soil and groundwater is 100° C. or higher. The invention, however, is not limited to organic chemical remediation and may also be applied for destruction of invasive species of plants, insects, and/or microbes from soil, wood chips or other fluid, solid, or semi-solid media, either in situ or in a specially constructed ex situ pile or container.

The reaction rates for both the abiotic and biotic degradation mechanisms are at least partially temperature dependent, meaning that generally as temperature increases so do the reaction rates. This increase in reaction rates with temperature is described by the Arrhenius model, which states that for every 10° C. increase in temperature there is approximately a 2-fold increase in the abiotic and biotic reaction rates. For example, increasing the temperature of soil and groundwater impacted with carbon tetrachloride from a temperature of 20° C. to 70° C. results in more than 3 orders of magnitude increase in the hydrolysis reaction rate, reducing the half-life of carbon tetrachloride from 110,000 days to 40 days. As a result, by expediting the reaction speed and thus the removal of such organic compounds from the soil and groundwater, such heating allows areas that may have been rendered unsafe or uninhabitable, or that had suffered extreme environmental damage resulting from the presence of organic chemicals, to become safe for reuse and habitable again in relatively short timeframes. Remediation efforts that may have previously taken hundreds of years can be substantially reduced, and in some cases to less than a year, or potentially as short as days or hours.

As described herein, the approach to remediation that consists of low temperature heating has benefits in both biological and abiotic degradation. For example, for aerobic and anerobic biodegradation, increasing the temperature to 30° C. to 40° C. can increase biological reaction rates three to four times, which can reduce biologically mediated cleanup times and degradation times by similar factors. In other situations, higher or lower temperatures may be used for various other biodegradation mechanisms. Similarly, for abiotic remediation, such as hydrolysis (or using similar chemically reactive methods), increasing the treatment temperature to between 60° C. to 90° C. can substantially increase the abiotic reaction rate. For example, in the case of carbon tetrachloride, its hydrolysis half-life at 20° C. is 110,000 days, whereas at 90° C. the hydrolysis half-life is reduced to approximately 3 days. The present disclosure is not limited to hydrolysis however, and can function with other abiotic chemical reactions. Examples of other chemically reactive methods that can be thermally enhanced using the invention include, but are not limited to: dehalogenation, zero valent iron (ZVI, all forms colloidal and otherwise), in situ chemical oxidation (e.g., heat activated persulfate), and in situ chemical reduction (ISCR).

However, a common problem faced in the art is that for biologically mediated degradation reactions, there is an upper beneficial temperature limit. While some thermophilic bacteria can tolerate relatively high temperatures (e.g., as high as 122° C.), the bacteria responsible for the aerobic and anerobic degradation of organic chemicals can only typically tolerate temperatures in the range of 30 to 40° C. Increasing temperatures higher than this can result in the denaturing of the bacterial enzymes which can result in an overall slowing of their metabolic processes and reduce their effectiveness at degrading the targeted organic chemicals, and eventually result in the death of the bacteria. Similarly, some organic chemicals will only be partially degraded at these temperatures, resulting in the formation of intermediary chemicals that have as high or even higher toxicity. The present invention can resolve some of these issues by providing a highly controllable method for approaching the higher temperature tolerances of the bacterial enzymes without exceeding them, thus optimizing the ability of the bacteria to degrade the organic chemicals uniformly throughout the targeted treatment area. Incomplete or partial degradation and formation of other toxic organic chemicals can be prevented through the combination of the invention with other existing technologies targeting the complete breakdown or degradation of the chemicals (e.g., thermally enhanced chemical reactions). The use of the invention in combination with these other technologies has the advantage of increasing the rate and efficacy of the technologies resulting in a more uniform, rapid, sustainable, and less costly treatment.

An additional advantage of the invention, is that by, according to some examples of the invention, limiting heating to temperatures to less than 100° C. to destroy organic chemicals in situ, water isn't removed from the soil by boiling and steam generation, which eliminates concerns associated with potential subsidence and adverse impacts to buildings and structures due to decreases in pore pressures and consolidation of soils. Furthermore, the operational temperatures of the LTTT heaters are sufficiently low to prevent unwanted oxidation (combustion) of high organic soils such as peats or meadow matt and the associated risk of subsidence due to compaction. The low operating temperatures of the LTTT heaters and absence of active vapor extraction and associated air movement in the subsurface, can also eliminate concerns associated with the uncontrolled in situ combustion of NAPL such as petroleum hydrocarbons, creosote, and coal tar. Such scenarios can also lead to subsidence due to compaction if large volumes of NAPL exist and are removed as a result of in situ combustion.

While described in the context of soil and groundwater, the above method may have application in other porous, fluidic, semi-solid, and solid media as a means of remediation or modification thereof, and the present disclosure should not be read as limited to soil and groundwater as the sole circumstance in which the present invention could be employed. The present invention may also be employed in other circumstances outside of those in which organic chemical remediation reactions are being enhanced, and should not be read as limited to those specific circumstances. For example, an alternative embodiment of the invention can be used in the eradication of invasive or undesirable plant species such as Japanese Knotweed. It has been shown that heating the root zone and soil (typically 1 to 2 m below ground surface (bgs)), of an area infested with Japanese Knotweed to temperatures in the range of 60° C. to 80° C.

for several days will kill the plant and prevent new growth. Alternatively, the invention could be used in an ex situ capacity to heat and sterilize soil and/or other materials placed in a specially constructed above ground pile or container. An example of this type of application could be heating wood chips and lumber to kill unwanted microbes, insects, or plants such that the wood chips can be exported to other regions or countries without risk of introducing invasive flora or fauna. Heating wood chips and lumber to temperatures ranging from 46 to 70° C. for a period of 1 to 4 hours has been shown to kill insect infestations.

Furthermore, the present invention is not exclusive of other treatment options, and in fact is capable of being configured to operate in tandem and/or as a supplement to or with one or more additional treatment methods of various natures. For example, the present invention can be employed with, but is not limited to, injection-based remediation technologies such as In Situ Chemical Oxidation, In Situ Chemical Reduction, zerovalent iron (ZVI), and other enhanced biological approaches such as Enhanced Reductive Dechlorination, but can also work with other approaches. In the foregoing examples of approaches that rely on abiotic and/or biotic chemical reactions, said reactions degrade and/or destroy the organic compounds. In many cases, though not all, the increased temperature provided by the present invention can enhance the effectiveness, efficiency, and speed of the methods and thereby reduce their cost and timeframe, among other benefits, while in other situations an embodiment of the present invention can remediate some of the contaminants while another method can remediate others.

Although there exist other approaches utilizing geothermal methods to heat soil and groundwater, as well as other media, to the desired temperature range to stimulate biotic and/or abiotic degradation rates (i.e., solar collectors and circulating heat transfer fluids in borehole heater exchangers [BHEs], and conventional electrical resistant heating [ERH] and Thermal Conduction Heating [TCH] operated at a lower power input), these methods have limitations such as, but not limited to: non-uniform heating where some portions of the target treatment zone may be too cold while others may be too hot; and such portions may vary based on factors such as media density, composition, thermal conductivity, and permeability (solar collectors and BHEs); slower than desired timeframe for heating; large footprint required for energy source (e.g., solar collectors); diurnal cycles of heating and cooling wherein the heating has to be slowed during some portion of the day due to lack of available energy (e.g., solar collectors); pumping; routing, and exchange of heat transfer fluids (solar collectors and BHEs) which can increase costs and risk associated with accidental environmental contamination; and the cost of drilling and installing the BHEs. Although, conventional ERH and TCH can be used for LTTT, these methods are tailored to much greater power input rates than required for some embodiments of T and entail substantial efforts and costs associated with drilling, materials, and equipment. Some embodiments of the present invention described herein proposes systems and methods in which thermal conduction heating technology utilizing low-cost, small diameter, easy to install electric powered heaters are applied to thermally enhance the abiotic and biotic degradation and remediation of organic chemicals present in soil and groundwater; thereby addressing the limitations of existing low temperature heating methods. Some embodiments of this invention describe the use of electrically powered heaters; however, use of other heating sources, including steam heat, hydronic hot water, or other fired heat sources may be contemplated, if such sources are readily available or more economical than the electrical heaters described below, and use of such alternate heating sources would be obvious to those skilled in the art. Furthermore, nothing contained herein should be read to confine the heating to the presently disclosed methods, as esoteric and future developed methods of heating could be configured to be implemented in the presently disclosed system. Additionally, some embodiments of the disclosed invention may allow for control of individual heaters, allowing a system to make specific adjustments on a per-heater basis to reach a desired heating result.

The release of organic chemicals to soil and groundwater has resulted in the pollution of natural resources and severe threats and impacts to public health and the environment in industrial, residential, and rural areas around the world. Existing methods for the remediation of organic chemicals present in soil and groundwater are often intrusive, costly, dangerous to workers, sometimes ineffective, and can result in significant consumption of materials and energy. The technology proposed herein, the use of, in some embodiments, electrically powered heaters to gently heat soil and groundwater to temperatures between, in some embodiments, approximately 30 and 90° C. to enhance microbial activity and abiotic reactions, will reduce the time required for degradation of organic chemicals and remediation of impacted sites while minimizing the effort and cost to do so. In other embodiments, different temperatures may be employed depending on the needs of the site, including heating over 100° C. in some instances and/or conditions.

The use of, in some embodiments, electrically powered heaters and thermal conduction heating to gently heat sites impacted with organic chemicals provides the following advantages over traditional remediation methods: 1) the heaters can be simply, rapidly, and inexpensively installed to desired depths using methods including, but not limited to, mobile and small track-mounted direct-push technology, 2) in some embodiments, all components can be easily installed below grade, thereby allowing unencumbered access and use of the site during the remediation process, 3) gently heating to temperatures less than approximately but not necessarily 100° C. does not generate steam and therefore removes the need for expensive extraction and treatment systems and operating and maintenance labor associated with such systems, 4) once installed and operating, the system can be monitored remotely, so very minimal operations and maintenance is required, 5) natural biotic and abiotic process are utilized and enhanced by the heating to degrade the chemicals and remediate the site in situ, so no excavation, trucking, and disposal of contaminated material is required, 6) sites are safely cleaned with minimal risk to workers and the public, 7) the reliance on low impact and gentle heating to enhance naturally occurring biotic and abiotic reactions significantly reduces the consumption of natural resources (steel, copper, concrete, equipment, fuel, chemicals, energy, etc.) and the associated $CO_2$ footprint associated with remediating soil and groundwater contaminated by organic chemicals.

In many cases, traditional heating methods can be inefficient, overly expensive, or damaging to the surrounding area. For example, some heating methods implement electrically powered heaters that operate at 400 to 600° C. heat contaminated sites to 100° C. or higher, which results in rapid and effective remediation, however, can also result in the boiling of soil moisture or groundwater in the area, creating steam and vaporizing other contaminants, which thus need to be controlled, extracted, and treated. In some cases, exceeding a boiling temperature of water could result in the release of additional toxins. If there is a break in the containment or other control, these vaporized contaminants can pose an environmental or health risk to the surrounding area and hinder the remediation effects. By utilizing a lower heating temperature, as the present invention does, these risks can be mitigated and/or outright avoided. The present invention could also be employed in media located underwater, or in other liquid or semi-solid media. Furthermore, thanks to its ability to scale to meet the needs of its site, the invention could be used in small sites requiring a small number of heaters, such as residential neighborhoods. In addition, due to its relatively low heat, the present invention is less likely to have an adverse impact on the local environment overlying the targeted treatment zone, potentially allowing for continued human habitation in the surrounding area during decontamination.

The present invention, in some embodiments, presents a cost-effective, easy to install and operate, sustainable remediation option where others may be less desirable due to inefficiencies or other issues. The present invention therefore solves an existing problem in the art, wherein the existing solutions may be too potent for the tasks required, thus exceeding the need and potentially resulting in unwanted damage to an area or exposure and containment risks. The present invention's system allows for narrow profile heaters, meaning they can be installed in small diameter pipe and/or boreholes (or other installation methods) using, among other potential methods, fast direct-push drilling technologies, or simple horizontal slit trenches for shallow applications. This approach also allows for greater customization due to the reduced need for supply and return piping.

In the existing art, low temperature heating frequently relies upon the circulation of heated fluids through BHEs to deliver the energy and heat to the media being heated, which can require intrusive and expensive drilling and installation, along with an extensive and expensive network of supply and return piping, along with the tanks, pumps, valves, controls, and other mechanisms needed to operate such systems. Such systems also come with the inherent risk of leakage or other externalities that can hinder the remediation efforts or exacerbate the environmental damage being remediated.

In the present system, in some embodiments, the low voltage, low power heaters can be easily customized in the field to the required heating lengths, eliminating costly fabrication and shipping charges. The heaters may also be constructed of simple, commercially available, and relatively inexpensive materials that can be re-used on future projects. All of the heater components: casing, heating element, electrical connections, and cabling, can be easily installed below grade, thereby allowing full access and use of the targeted treatment area during remediation. The ability to accurately monitor and control the power output and temperature of each heater along its entire length provides a distinct advantage over other low temperature technologies that rely on heating fluids using solar, hot water heaters, and/or waste heating methods, and circulating them through BHEs located throughout the well field. The circulation of heated fluids through a network of BHEs can result in uneven heating due to the variability of the temperature of the circulating fluid at different points in the well field and along the length of the BHE. Of course, according to other embodiments, more advanced and/or expensive heaters or even BHEs may also be used if appropriate for the specific embodiment.

One embodiment of the present invention is constructed of small diameter heating elements installed in small diameter piping (i.e., the heater casing) which may be constructed of carbon steel, stainless steel, fiberglass or other suitable material(s). The elements themselves may consist of commercially available heating cables or tapes, and/or custom-designed and fabricated insulated electrical heaters, as determined by project requirements, suspended directly in the heater casing or spirally wound around a central support rod and lowered into the heater casing, depending on the depth, power output capacity (e.g., watts per ft) of the heater element, and the desired power output for a particular site. The heating element may also be directly buried and/or grouted in a borehole (i.e., using no pipe or heater casing). In other configurations, the cables and/or tapes could be affixed to a central support rod, such as, but not limited to, aligned vertically along the borehole, wrapped in a helical pattern, or affixed in a mesh or net pattern. Such elements could be metallic in nature, comprised of composites or other media capable of producing and conducting heat due to electrical current flow, or a combination of several components depending on the needs of the embodiment and implementation. The exact size of the heating elements can vary depending on the nature of the project and area to be treated, with wider, thicker, or longer elements utilized as necessary. The presently disclosed mechanism may also be employed in shallow horizontal slit trenches to address shallow soil contamination or invasive species infestation, or may be applied at significant depths, depending on the depth of the contamination.

Alternatively, the heater may consist of a heating element constructed of a length of stainless steel or nichrome wire (or other similar substance with desirable properties which may include, but is not limited to, other metals or composite materials) running down the center of the entire length or a targeted portion of a carbon steel pipe, or directly buried in a borehole, corresponding to the desired heating interval in the subsurface. In the latter case, the heating element could consist of two elements, side-by-side, in the borehole and electrically connected at the bottom with a "U" shaped bend or electrical junction. The two elements can, if needed for the embodiment, be electrically isolated using non-conductive material or spacers along the entire length of the elements. Power would be applied to one leg of the element and returned by the other, generating a current. In the pipe configuration, the top of the wire heating element could be connected to a power supply cable that then exits the top of the heater through a cap, or attaches to another portion of the heater cable. The bottom end of the heating element would then be directly and electrically connected to the bottom end cap of the heater casing or returned to the top cap by an electrically isolated, temperature rated power return cable. Power would be applied to the heater element through the top power supply cable, with the heater casing or the electrically isolated, temperature rated power return cable serving as the power return. A dual-element heater configuration as described above for the directly buried borehole embodiment, could also be used in the pipe configuration. A series of such heaters could be connected in series with the power lead for the next heater connected to the casing (power return) of the previous heater. Heaters may also be connected in parallel or in series/parallel combinations, depending on desired circuit electrical characteristics and available power supply capacity. In other embodiments similar to the foregoing, the heating element may be comprised of a different metallic alloy, or of a combination of several alloys. The system could also have the power run up and down the system to heat an outer casing shell, or use an alternative configuration of the power source such that the heater cable is utilized to heat the surrounding area either directly or indirectly. In other embodiments, a single heater unit may have multiple power inputs or outputs, or have a single for each that then splits power among a number of cables and/or legs to distribute heat throughout the heater. While some embodiments use a rod shape, other heaters may use different configurations or shapes such that they are still configured to provide the heating necessary for the invention.

In some embodiments, the heater may consist of a heating element constructed of a length of stainless steel or nichrome wire (or other similar material with desirable properties) running along the center of the entire length or a targeted portion of a carbon steel pipe, though the composition of the pipe may vary depending on the embodiment. The top of the wire heating element could be connected to a power supply cable that then exits the top of the heater through a cap, or attaches to another portion of the heater cable. The bottom end of the heating element would then be directly and electrically connected to the bottom end cap of the heater casing. One leg of a three-phase power supply (A, B, or C) would be applied to the heater element through the top power supply cable, with the heater casing serving as an top electrode in a three-phase Electrical Resistance Heating (ERH) system. The heaters/electrodes would be arranged in triangular patterns with each triangle of heaters/electrodes consisting of A, B, and C phases. As the voltage sine waves from the three-phase power supply are sequentially applied to the A-, B-, and C-phase heaters/electrodes (each phase off-set from the next by 120°), current will flow through the heating element (A. B. or C) and then through the soil to the surrounding heater/electrodes. This embodiment of the invention then utilizes a combination of TCH and ERH to efficiently and cost-effectively heat the targeted treatment zone. A network of such heaters/electrodes could be laid out and connected in a three-phase power configuration, such that each heater/electrode has neighboring heaters/electrodes of different phases (e.g., an A-phase heater/electrode is bordered by B- and C-phase heaters/electrodes).

In some embodiments, a multiplicity of heaters could be installed in typical arrangements for efficient thermal conduction heating (e.g., triangular or rectangular patterns), throughout and surrounding the targeted treatment zone. The heaters may be powered and controlled individually or in groups, depending on how they are connected. Temperature monitoring points could be installed immediately adjacent to and in between the heaters to monitor the rate of heat-up and temperature of both the heater itself and the surrounding soil and groundwater. Power output to specific heaters or groups of heaters would be adjusted to result in the uniform heat-up and achievement of the desired target temperature. In some embodiments, various patterns may be employed by the heaters based on the media to be treated to ensure preferred effectiveness based on the needs of the site and/or volume and embodiment. Some embodiments may also employ heaters positioned at different depths if appropriate for treatment based on the composition of the subsurface, volume, and/or site.

The power supply for such an invention could come from a multitude of sources, including, but not limited to, solar, tidal, wind, or other renewable sources whether they are located on-site or come from an external provider. For some remediation efforts, connections could be made to a municipal power grid, with appropriate power modulation and regulation components, to allow the remediation to be powered by said municipal power grid. The system could also be powered by other methods yet to be developed, and is not specific to a single method of powering. In addition, some embodiments of the invention may be powered by a three-phase power system and/or a single phase power system, depending on the embodiment. Depending on the needs of the site, multiple powering methods could be used in tandem, or to supplement during downtime. For example, the system could be powered by solar power during the day, and by alternative means during the night. Furthermore, the system in some configurations could be powered entirely by solar, relying on charging batteries using excess charge accumulated during the day and discharging that overnight. Where available and economical, the electrically powered heating elements could be replaced by pipes or coils containing low-pressure steam, hydronic hot water or other heat transfer fluid.

In another embodiment, electrically powered heating elements may be installed in vertical borings or wells or in shallow horizontal slit trenches in the manner described previously to treat for invasive plant species. For example, studies have found that Japanese Knotweed may be killed by heating soils in the root zone at temperatures of 60 to 80° C. and holding at temperature for several days. Heaters, such as those described previously, can be installed across a planting field or other infested portion of a property at a spacing of 15 to 20 feet (4.5 to 6 meters), or at wider spacing if longer heating time is acceptable, or more narrowly if a shorter heating time is preferred. Heaters can be operated to maintain the desired target temperature for a period of several days to kill the plant and root structure of invasive species.

In a further embodiment, soils, wood chips or other media impacted (or potentially impacted) with invasive plant or insect species may be loaded into containers or bins for low temperature thermal treatment, at a temperature and duration sufficient to kill the invasive species. Heating elements, as described previously, may be placed in the bins to heat the impacted media directly, and/or placed in the walls and floors to heat the impacted media indirectly. Containers or bins may be commercially available bins with 1 to 5 cubic yard capacity, or "roll-off" box containers with capacity ranging from 10 to 40 cubic yards, or even greater amounts, or custom-built containers with capacity from 10 to 100 or more cubic yards or as appropriate for the project. Such containers may have removable or hinged covers, and may have hinged doors on either or both end walls or may have a hinged bottom to facilitate easy emptying of materials. Containers may have mounting brackets and ports installed to allow heating elements or power cables to pass through the walls, floor or roof, depending upon the desired configuration. Once the impacted media and heating elements are installed the thermal treatment may proceed in a batch process, to heat the impacted media to target temperature and hold for the specified duration. The impacted media may be allowed to cool prior to removal from the container, then additional batches of impacted media may be treated in the same container. Several containers may be grouped together to facilitate rotating filling, heating, cooling and emptying batches.

FIG. 1 depicts a side view of a low temperature thermal treatment system in accordance with an embodiment of the invention. In some example embodiments, the system 100 for low temperature thermal treatment may be comprised of one or more heaters 102 embedded into a target volume 104 located in a target site 106 wherein the one or more heaters 102 may be connected to a power source 108 through a power monitoring and control system 110. The system may be further comprised of one or more temperature sensors 112 which may also be embedded into the target volume 104 at one or more locations 114 in order to gauge the temperature of the target volume 104 based on the heating from the heaters 102 and would be connected to a temperature monitoring and control system 118. In some embodiments, the power source 108 may be a municipal power system or it may be through another form such as one or more solar panels which may or may not be affixed to homes and/or businesses near the target site 106. The target volume 104 may be contaminated with a contaminant 116 that may be located in a single portion of the target volume or scattered throughout.

The power monitoring and control system 110, depending on the embodiment, may provide for automatic or manual control of power input to the one or more heaters 102, and in the case of automatic, power input could be modulated based on data received from the one or more temperature sensors 112 regarding heat near one or more of the one or more heaters 102. Some embodiments of the invention may allow for independent adjustment to the power delivered to the one or more heaters 102 on an individualized basis. The power monitoring and control system 110 may also be configured to provide power to the one or more heaters 102 such that the heaters 102 gently and uniformly heat the target volume 104 surrounding it. This heating can help promote increased rates of biotic and abiotic reactions. The heaters 102 can then be modulated and regulated to maintain a desired temperature range, and in some cases temperature probes 112 and/or sensors may be incorporated to provide data regarding target volume 104 temperature.

Embodiments of this invention may be powered through a variety of power sources 108 (or combination hereof) including, but not limited to a local power grid, on-site power generation using a fossil fuel-fired electric power generator, at least one solar panel, or at least one wind turbine. Some embodiments may use other power sources or those yet to be developed, provided they can be transformed into suitable working voltages, such as, but not limited to, 480V, 277V, 240V, or 120V.

Depending on the specific embodiment, the heating of the target volume 104 may be continued for a period of time sufficient to achieve the goals of the specific embodiment, which in some cases may be verified by reviewing data regarding the operating power and/or temperature of the target volume 104 over time. In other situations, it may be desirable to take samples of the target volume 104 for laboratory analysis. According to some embodiments, the heaters 102 may be configured to heat the target volume 104 to approximately 100° C. based on the composition of the target site 106; this may be due to coordination between the power monitoring and control system 110 and the temperature monitoring and control system 118 which modulate the power to the one or more heaters 102, the heaters 102 may be configured such that they can only reach approximately 100° C., or there may be a combination thereof or other means of limiting the heating of the target volume 104.

Figure 2:
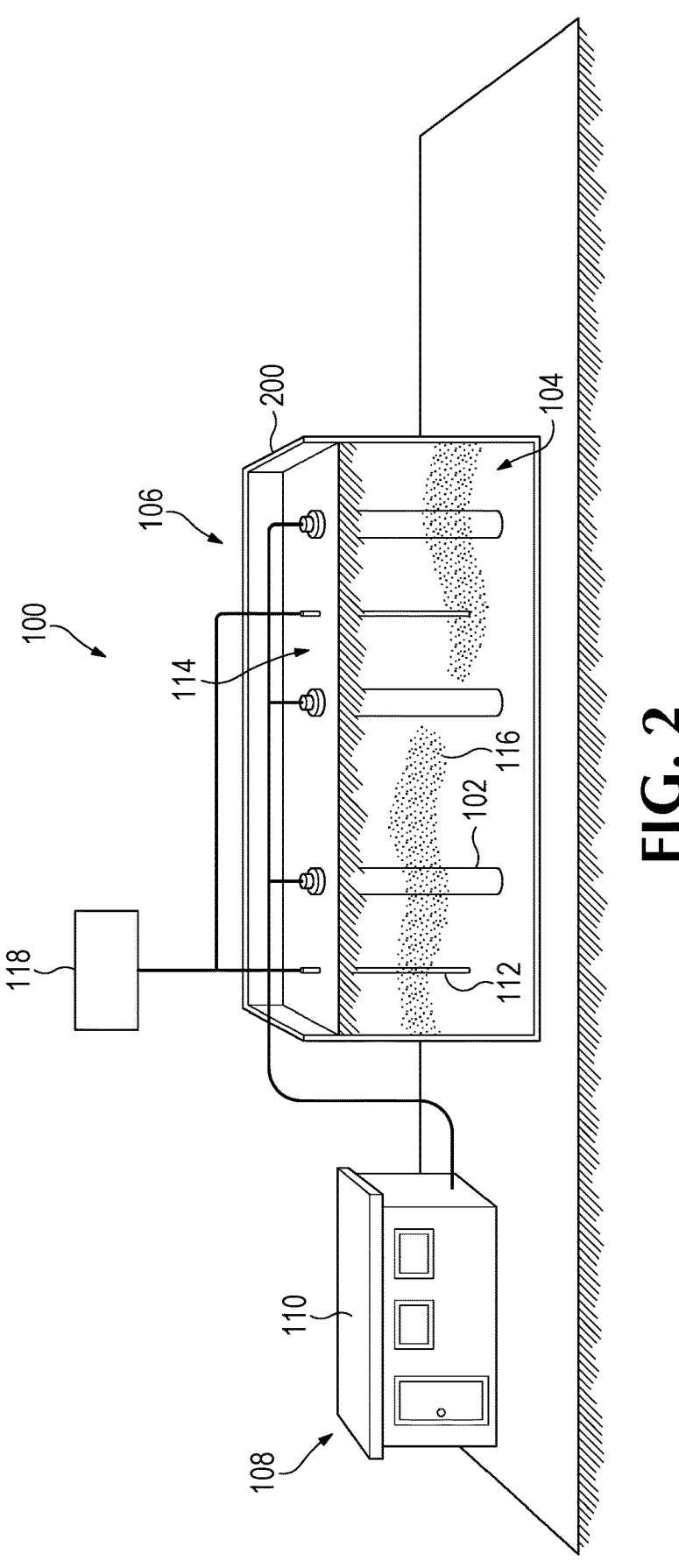
FIG. 2 depicts a side view of a low temperature thermal treatment system in accordance with an embodiment of the invention.

FIG. 2 depicts a side view of a low temperature thermal treatment system in accordance with an embodiment of the invention. In some example embodiments, the system 100 for low temperature thermal treatment may be comprised of one or more heaters 102 embedded into a target volume 104 located in a target site 106 wherein the one or more heaters 102 may be connected to a power source 108 through a power monitoring and control system 110. The system may be further comprised of one or more temperature sensors 112 which may also be embedded into the target volume 104 at one or more locations 114 in order to gauge the temperature of the target volume 104 based on the heating from the heaters 102, with said temperature sensors 112 being connected to a temperature monitoring and control system 118. In some embodiments, the power source 108 may be a municipal power system or it may be through another form such as one or more solar panels which may or may not be affixed to homes and/or businesses near the target site 106. The target volume 104 may be contaminated with a contaminant 116 that may be located in a single portion of the target volume 104 or scattered throughout. In some embodiments, the system may be practiced with the target volume 104 stored in a container 200; such container 200 may be a specially constructed containment device located above ground, or may be an in-ground basin or pool separated from the surrounding area. In some embodiments, the container 200 may be a number of smaller containers wherein the target volume 104 is split into sub-volumes and treated independently.

Depending on the needs of the target volume 104, the system 100 may be further comprised of placing the contaminated media, the target volume 104, in a container 200. Such container 200 could be anything from, but is not limited to, a specially created or generic above-ground containment device or a basin. In the case of the former the container 200 may have one or more removably or openable doors or roof to facilitate loading the target volume 104 into the container 200 prior to and possibly following treatment. In such an embodiment, the heaters 102 may be placed inside the container 200 to directly heat the contaminated target volume 104 or may be placed outside or inside the container 200 on walls, its floor, and/or a roof to directly or indirectly heat the contaminated target volume 104 inside the container 200 depending on the exact arrangement thereof. Such embodiments may also incorporate the same temperature monitoring apparatuses as described herein, including, but not limited to, temperature probes and/or sensors 112 that may be connected to a temperature monitoring and control system 118. Such probes and/or sensors 112 may be placed at random and/or at specific intervals in the container 200 to monitor the temperature therein or at one or more locations 114.

According to some embodiments, the container 200 may be configured in a variety of ways, such as having thermal insulation placed on some or all of the surfaces of the interior and/or exterior thereof to retain heat delivered by the heaters 102 and work in concert with them to provide proper heating as determined by the needs of the embodiment. Alternatively, some embodiments may utilize a container 200 in the form of a constructed pile wherein the contaminated target volume 104 is placed in such constructed pile for treatment. The pile, depending on the embodiment, may be insulated or otherwise constructed in such a way to avoid heat loss or impact to the surrounding environment. The pile may be constructed such that it does not require walls or a specific roof, but may be covered with a cover which may be insulated or waterproof to minimize heat loss and prevent infiltration into the pile. If there is a large target volume 104, multiple piles or containers 200 may be utilized in tandem, all connected to the same power and/or temperature monitoring systems 110, or may each have their own. Otherwise, the pile may be treated as if the target volume 104 was in a container 200 or at a target site 106.

Figure 3:
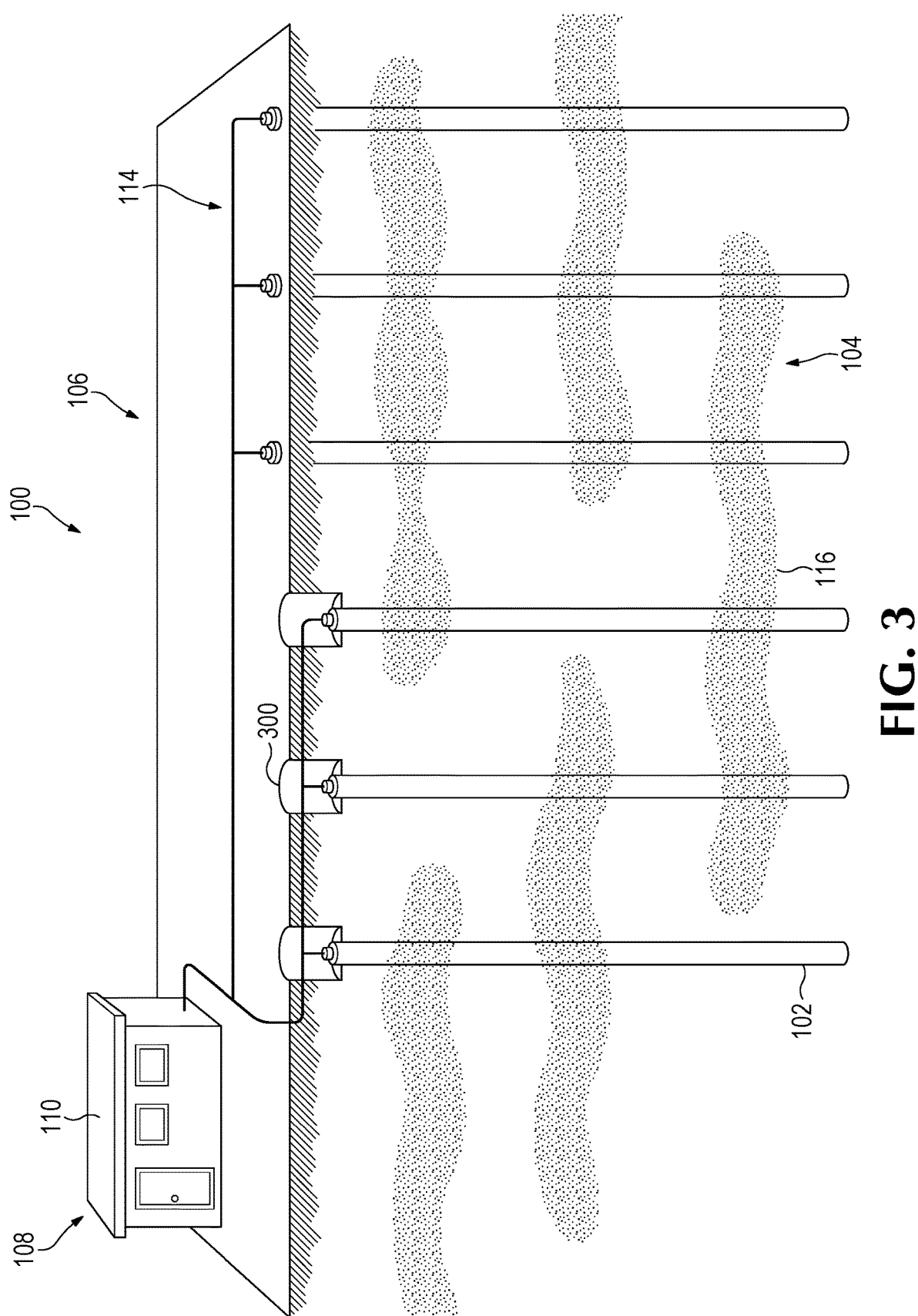
FIG. 3 depicts a side view of a low temperature thermal treatment system in accordance with an embodiment of the invention.

FIG. 3 depicts a side view of a low temperature thermal treatment system in accordance with an embodiment of the invention. In some example embodiments, the system 100 for low temperature thermal treatment may be comprised of one or more heaters 102 embedded into a target volume 104 located in a target site 106 wherein the one or more heaters 102 may be connected to a power source 108 through a power monitoring and control system. The system may be further comprised of one or more temperature sensors which may also be embedded into the target volume 104 at one or more locations 114 in order to gauge the temperature of the target volume 104 based on the heating from the heaters 102. In some embodiments, the power source 108 may be a municipal power system or it may be through another form such as one or more solar panels which may or may not be affixed to homes and/or businesses near the target site 106. The target volume 104 may be contaminated with a contaminant 116 that may be located in a single portion of the target volume or scattered throughout. According to some embodiments, some or all of the one or more heaters 102 may be fully embedded into the target site 106 or into a trench or hole 300 in the ground. This hole 300 or trench may be fully or partially covered depending on the needs of the embodiment, and may allow for easier access to the one or more heaters 102 while potentially protecting them from the environment around the target site 106.

Figure 4:
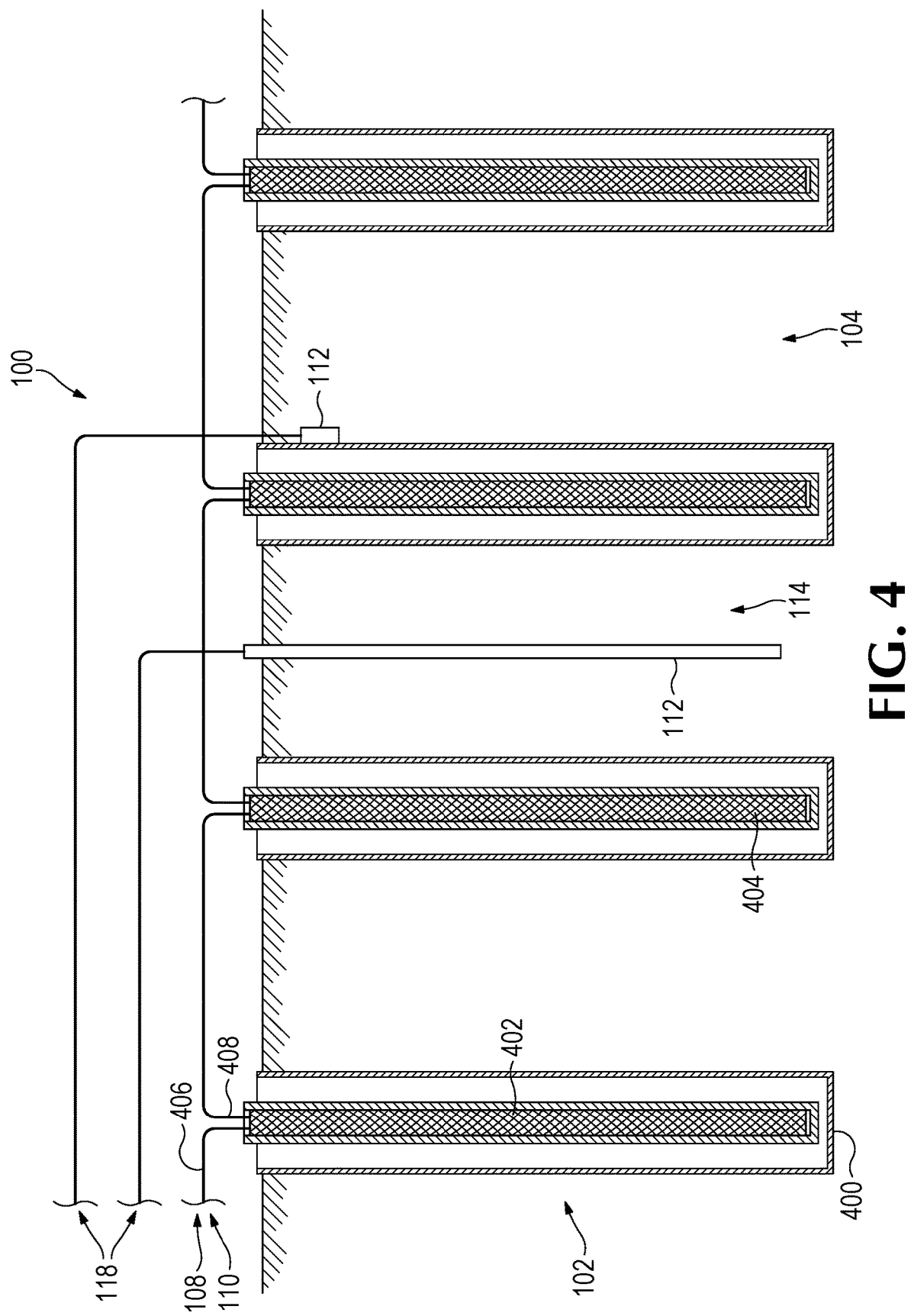
FIG. 4 depicts a side view of the heater arrangement of a low temperature thermal treatment system in accordance with an embodiment of the invention.

FIG. 4 depicts a side view of the heater 102 arrangement of a low temperature thermal treatment system 100 in accordance with an embodiment of the invention. In some example embodiments, the system 100 for low temperature thermal treatment may be comprised of one or more heaters 102 at least partially embedded into a target volume 104 wherein the one or more heaters 102 may be connected to a power source 108 through a power monitoring and control system 110. The system may be further comprised of one or more temperature sensors 112 which may also be embedded into the target volume 104 at one or more locations 114 in order to gauge the temperature of the target volume 104 based on the heating from the heater units 102. The heater 102 components may be installed in a casing 400, where said heater and casing 400 is then pushed into the treatment area of the target volume 104 using a variety of means including, but not limited to, a drill rig, pile driver, pneumatic or hydraulic hammer, or similar device. In situations where the conditions at the target site 106 the heater 102 is being inserted into are not suited for installation through a direct push or a direct push is otherwise not preferred by the embodiment, holes or trenches may be bored into the media and the heaters 102 may be installed therein. In some embodiments an outer casing 400 of the heater 102 might be installed first and then the heating components 402 of the heater may be installed separately depending on the needs of the embodiment, while in other embodiments they may be installed together or only the heating components 402 are installed. Some embodiments of the system 100 may be comprised of heaters 102 comprised of an outer casing 400 wherein the heating components 402 are comprised of a weave of conductive wire 404 that enters the heater 102 at a power input point 406 and leaves at a power output point 408.

Depending on the embodiment, the one or more of the heaters 102 may be equipped with one or more temperature monitoring devices, such as, but not limited to, temperature probes or temperature sensors 112, either affixed directly to the heater 102, to the outer casing 400, or placed in proximity to the one or more heaters 102 to monitor operating temperature of the one or more heaters 102 for system 100 monitoring, control, and/or safety purposes. In addition, some embodiments may be comprised of, or additionally comprised of, one or more temperature monitoring devices such as temperature sensors 112, wherein the temperature sensors 112 are at least partially embedded into the target volume 104, and which are connected to a temperature monitoring and control system 118 including sensors, cables, data acquisition equipment and monitoring software.

Figure 5:
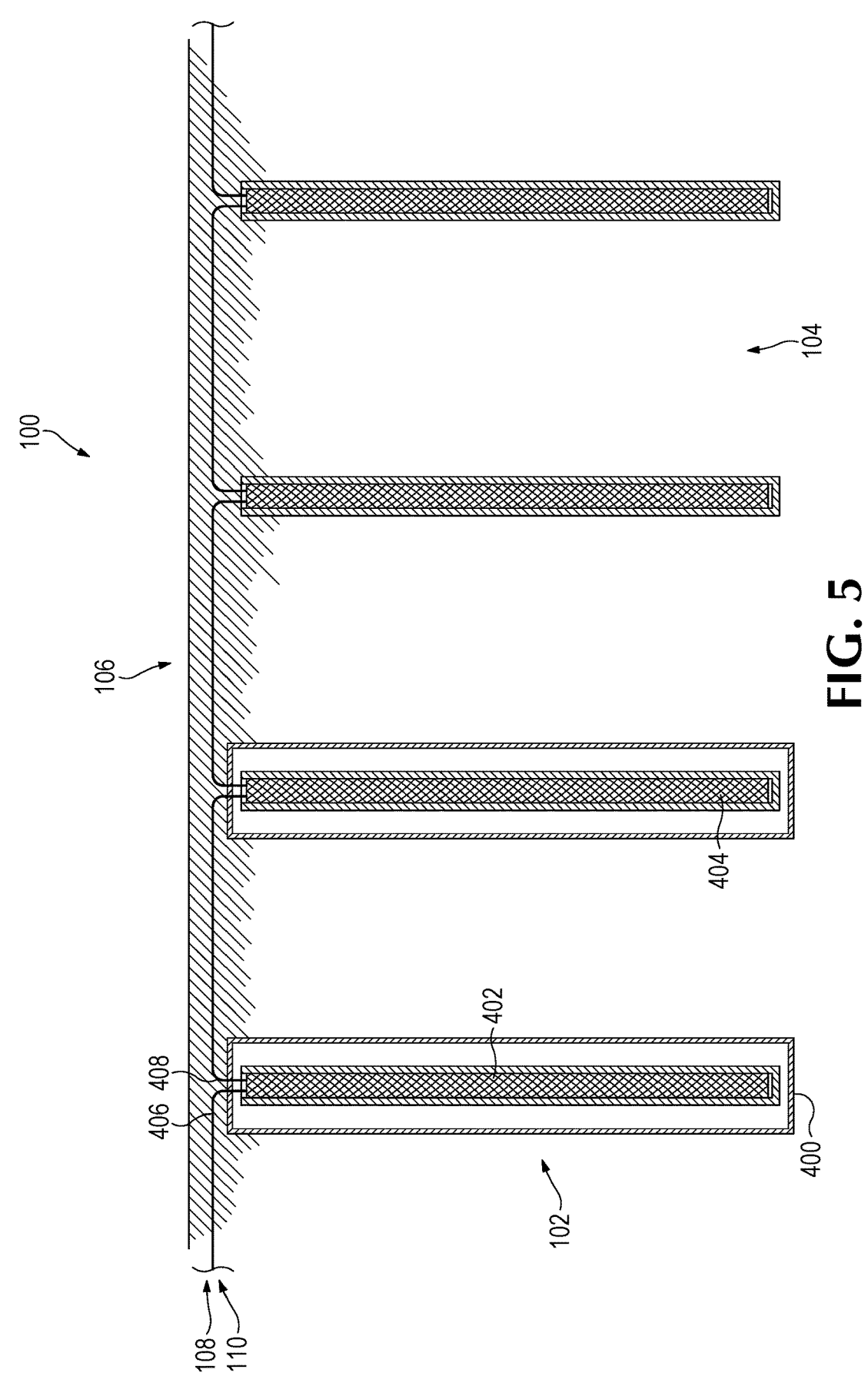
FIG. 5 depicts a side view of a heater arrangement of a low temperature thermal treatment system in accordance with an embodiment of the invention.

FIG. 5 depicts a side view of the heater 102 arrangement of a low temperature thermal treatment system 100 in accordance with an embodiment of the invention. In some example embodiments, the system 100 for low temperature thermal treatment may be comprised of one or more heaters 102 embedded into a target volume 104 wherein the one or more heaters 102 may be connected to a power source 108 through a power monitoring and control system 110. The system may be further comprised of one or more temperature sensors which may also be embedded into the target volume 104 at one or more locations in order to gauge the temperature of the target volume 104 based on the heating from the heater units 102. The heater 102 may be comprised of heating components 402 which may be installed in a casing 400, where said heater 102 is then pushed into the treatment area of the target volume 104 using a variety of means including, but not limited to, a drill rig, pile driver, pneumatic or hydraulic hammer, or similar device. In situations where the conditions at the target site 106 where the heater 102 is being inserted into are not suited for installation through a direct push, or if otherwise desired for the embodiment, holes or trenches may be bored into the media and the heaters 102 may be installed therein. In some embodiments an outer casing 400 of the heater 102 might be installed first and then the heating components 402 of the heater 102 may be installed separately, while in other embodiments they may be installed together or only the heating components 402 are installed. Some embodiments of the system 100 may be comprised of heaters 102 comprised of an outer casing 400 wherein the heating components 402 are comprised of a weave of conductive wire 404 that enters the heater 102 at a power input point 406 and leaves at a power output point 408.

Figure 6:
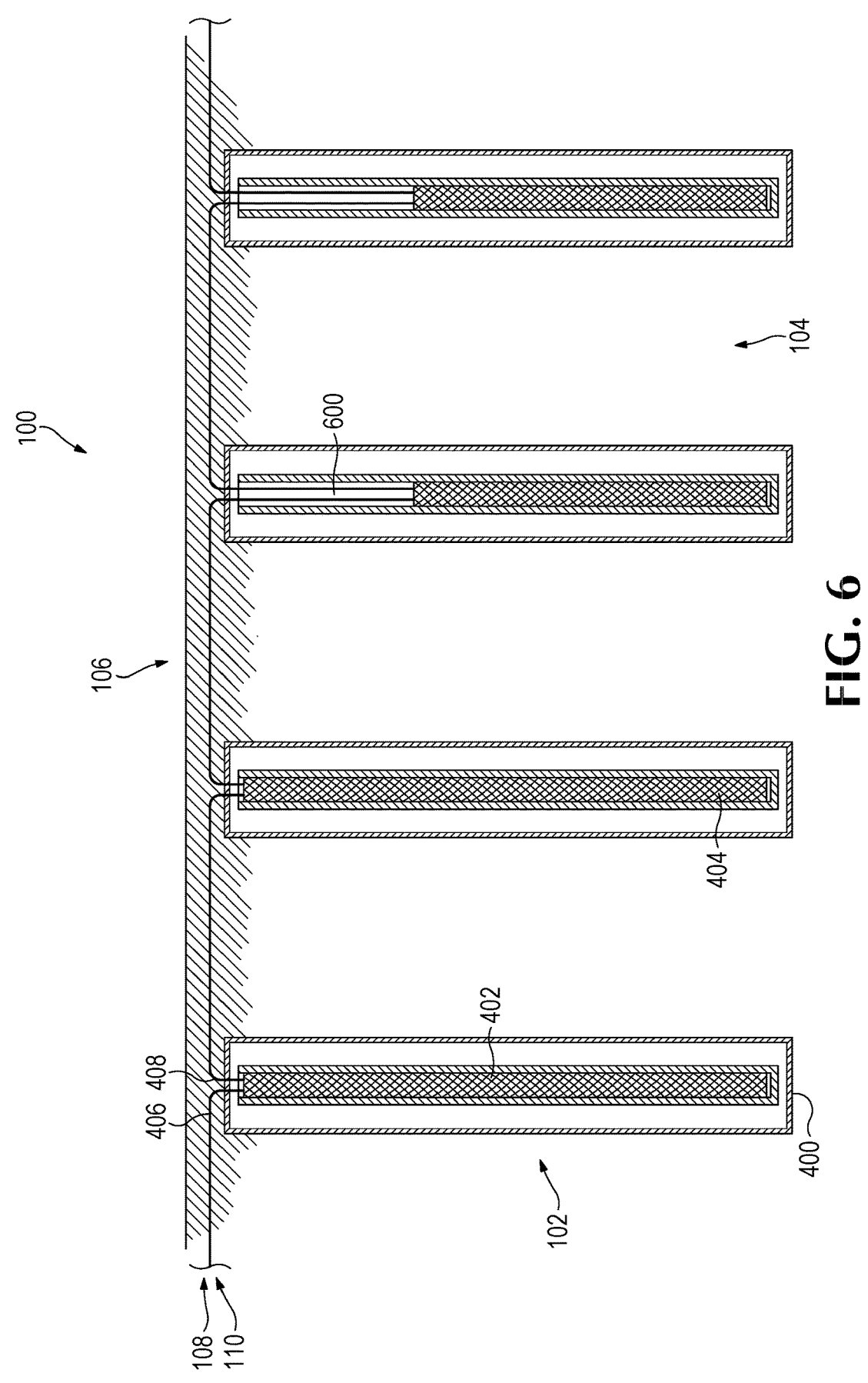
FIG. 6 depicts a side view of a heater arrangement of a low temperature thermal treatment system in accordance with an embodiment of the invention.

FIG. 6 depicts a side view of the heater 102 arrangement of a low temperature thermal treatment system 100 in accordance with an embodiment of the invention. In some example embodiments, the system 100 for low temperature thermal treatment may be comprised of one or more heaters 102 embedded into a target volume 104 wherein the one or more heaters 102 may be connected to a power source 108 through a power monitoring and control system 110. The system may be further comprised of one or more temperature sensors which may also be embedded into the target volume 104 at one or more locations in order to gauge the temperature of the target volume 104 based on the heating from the heater units 102. The one or more heater's 102 heater components 402 may be installed in a casing 400, where said heater 102 is then pushed into the treatment area of the target volume 104 using a variety of means including, but not limited to, a drill rig, pile driver, pneumatic or hydraulic hammer, or similar device. In situations where the conditions at the target site 106 where the heater 102 is being inserted into are not suited for installation through a direct push, or it is otherwise preferred by the embodiment, holes or trenches may be bored into the media and the heaters 102 may be installed therein. In some embodiments an outer casing 400 of the heater 102 might be installed first and then the heating components 402 of the heater 102 may be installed separately, while in other embodiments they may be installed together or only the heating components 402 are installed. Some embodiments of the system 100 may be comprised of heaters 102 comprised of an outer casing 400 wherein the heating components 402 are comprised of a weave of conductive wire 404 that enters the heater 102 at a power input point 406 and leaves at a power output point 408. In some embodiments, the heater components 402 of the heater 102 may only extend part of the way down or for portions of the heater 102, leaving an empty area 600 which may not emanate heat. In addition, some embodiments may combine various types of heaters 102, some which may be capable of heating the entire length, while others may have an empty area 600 or multiple empty areas 600. Some embodiments may have empty areas 600 separated by areas of heater components 402.

Figure 7:
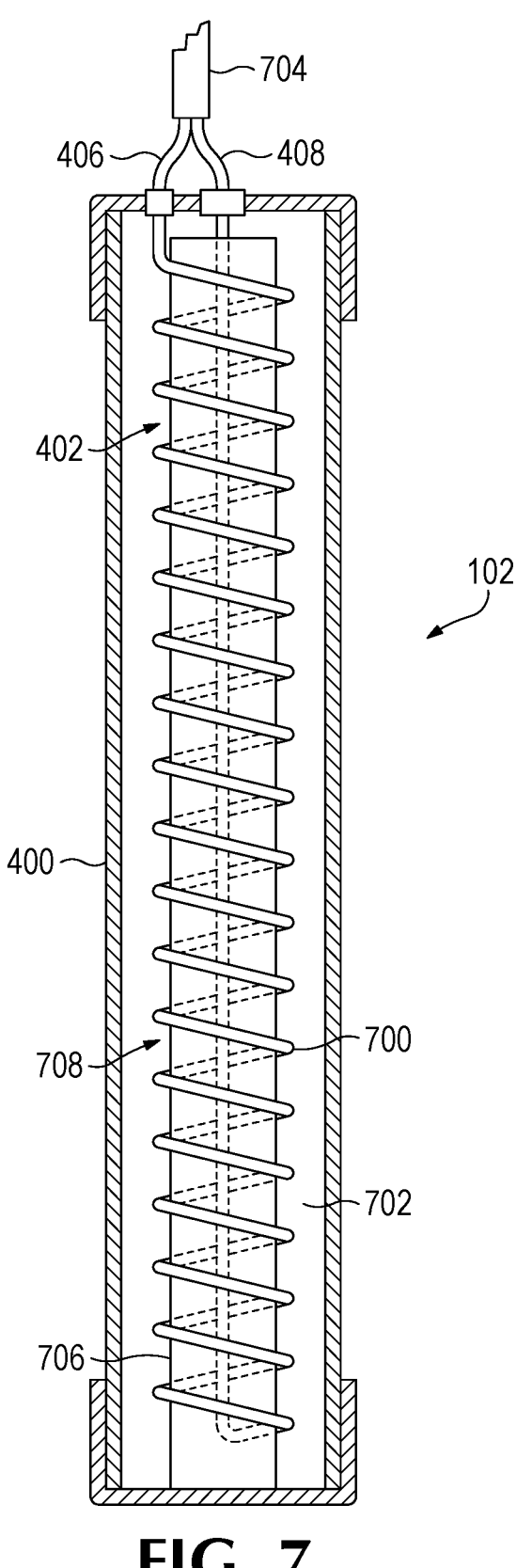
FIG. 7 depicts a side view of an example of a heater component of a low temperature thermal treatment system in accordance with an embodiment of the invention.

FIG. 7 depicts a side view of an example of a heater 102 of a low temperature thermal treatment system in accordance with an embodiment of the invention. In some example embodiments, the system for low temperature thermal treatment may be comprised of one or more heaters 102 embedded into a target volume wherein the one or more heaters 102 may be connected to a power source through a power monitoring and control system that inputs power through a power input point 406 and the current leaves the heater 102 through a power output point 408.

In some embodiments of the invention, one or more heaters may be placed directly in contact with the targeted volume or may be placed inside an outer casing 400 or tubing to protect the heater 102 from exposure to the media comprising the targeted volume and to provide for easy access to the heater components 402 for repair and maintenance purposes. According to some embodiments, some of the one or more beaters 102 may be placed in direct contact with the targeted volume, while some of the one or more heaters may be placed inside an outer casing 400 or tubing, while some may be partially encased and partially in direct contact with the targeted volume, depending on the needs of the site.

Depending on the needs of the embodiment, the heaters 102 may be constructed of one or more heating wires 700 (with alloy composition suited to the application, such as, but not limited to Nichrome alloys [e.g., Nichrome 60, Nichrome 80, etc.]) or other alloys such as an iron-chromium-aluminum alloy, sometimes referred to as "FeCrAl" alloys. Such heating wires 700 may be installed in a temperature-rated, electrically non-conductive sleeve or may be equipped with continuous or non-continuous insulation comprised of ceramic tubular forms, ceramic beads, or other suitably temperature rated, electrically non-conductive insulating materials 702. Such heating wires may be installed inside an outer casing 400 that may be made of a metal (e.g., carbon steel) and electrically insulated from the walls of the pipe using a non-conductive thermally stable powder or filling such as magnesium oxide as an insulating material 702, that has suitable thermal conduction properties, and which is placed in the casing 400 from the top. Other embodiments may feature no insulating material 702. Other suitable insulating materials 702 and configurations for electrically insulating the heating element from the sidewalls of the pipe may also be used (e.g., ceramic sleeves or beads, electrically insulating cloth sleeves, fiberglass sleeves, etc. that have suitable thermal properties). The top of the wire heating element would be connected to a suitably rated electrical supply cable 704 to power the heating element, where such cable would have a power input point 406 and power output point 408. Electrical current and power would be delivered to the heater 102 and either allowed to directly discharge to the earth ground in contact with the pipe, or a return grounding wire would be attached to the top of the pipe as it exits the ground surface and tied back to the power supply to complete the electrical circuit of the heater through the power output point 408.

In some embodiments, the heating components 402 of the heaters 102 may be comprised of mineral insulated cable heating elements, in which one or more resistance heating wires is placed in a tubular metal sheath that is filled with magnesium oxide and compressed through an extrusion jig to form a semi-rigid heating cable of the desired length. Terminal ends of such mineral insulated heating cables may be sealed by soldering, welding or use of an epoxy potting compound to prevent water infiltration to the heating element, and provided with temperature-rated, electrically insulated power leads.

The heating components 402 of the one or more heaters 102 can be comprised of a variety of configurations, including one or more high-output heat tracing cables capable of delivering an aggregate power output of 150 to 200 watts per foot. Such heat tracing cables may be integrally self-regulated with regard to power delivery and temperature or may be regulated with an external power controller. The heat tracing may be wrapped in a spiral manner around a central carrier rod, tube or pipe. The spacing between adjacent spiral wraps (i.e., the pitch) may be varied to modify the power delivery per unit length of the carrier rod (watts per foot). Some embodiments of the heating components 402 of the one or more heaters 102 may be comprised of an electrically conductive heating wire 700 that is wrapped around an inner casing 706 and then leaves the heater 102 by going up through the inner casing 706 and out, creating a spring-like shape 708 that generates heat.

Figure 8:
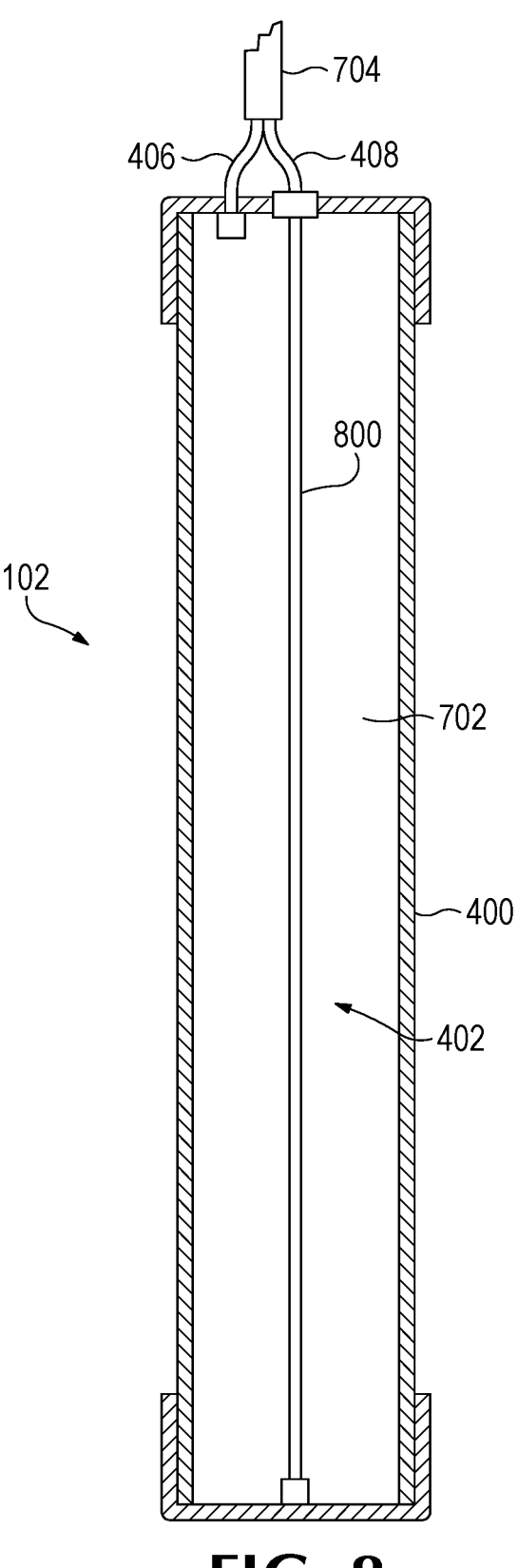
FIG. 8 depicts a side view of an example of a heater component of a low temperature thermal treatment system in accordance with an embodiment of the invention.

FIG. 8 depicts a side view of an example of a heater 102 of a low temperature thermal treatment system in accordance with an embodiment of the invention. In some example embodiments, the system for low temperature thermal treatment may be comprised of one or more heaters 102 embedded into a target volume wherein the one or more heaters 102 may be connected to a power source through a power monitoring and control system that inputs power through a power input point 406 and the current leaves the heater 102 through a power output point 408. The one or more heaters 102 might be comprised of a heating element inserted into a pipe-shaped outer casing 400. Depending on the embodiment, other suitable insulating materials 702 and configurations for electrically insulating the heating element from the sidewalls of the outer casing 400 may also be used (e.g., ceramic sleeves or beads, electrically insulating cloth sleeves, fiberglass sleeves, etc. that have suitable thermal properties). The top of the wire heating element would be connected to a suitably rated electrical supply cable 704 to power the heater 102. The bottom of the element may be directly electrically connected to the electrically conductive metal pipe. Electrical current and power would be delivered to the heater 102 and either allowed to directly discharge to the earth ground in contact with the outer casing 400, or a return grounding wire would be attached to the top of the outer casing 400 as it exits the ground surface and tied back to the power supply to complete the electrical circuit of the heater 102. Alternatively, in some embodiments the wire heaters 102 are comprised of electrically conductive rods (e.g., including, but not limited to, stainless steel of various grades). The rod heaters 102 would be insulated and electrically connected in similar fashion as described in the preceding paragraphs.

According to some examples of the invention, the system may utilize heaters 102 comprised of electrically conductive rods 800 (e.g., stainless steel of various grades). The rod heaters 102 would be insulated with insulating materials 702 and electrically connected in similar fashion as described in the preceding paragraphs, with a power input 406 and power output 408. Some embodiments of the rod 800 embodiment heater 102 may possess an outer casing 400 while others may involve the rod 800 alone. Depending on the embodiment, the rod 800 itself may be the electrified element or it may be in electrical contact with the outer casing 400. In embodiments with no outer casing 400 but a rod 800, the rod 800 may discharge the electricity into the ground. In these embodiments, the rod 800 can function as the heating component 402.

Figure 9:
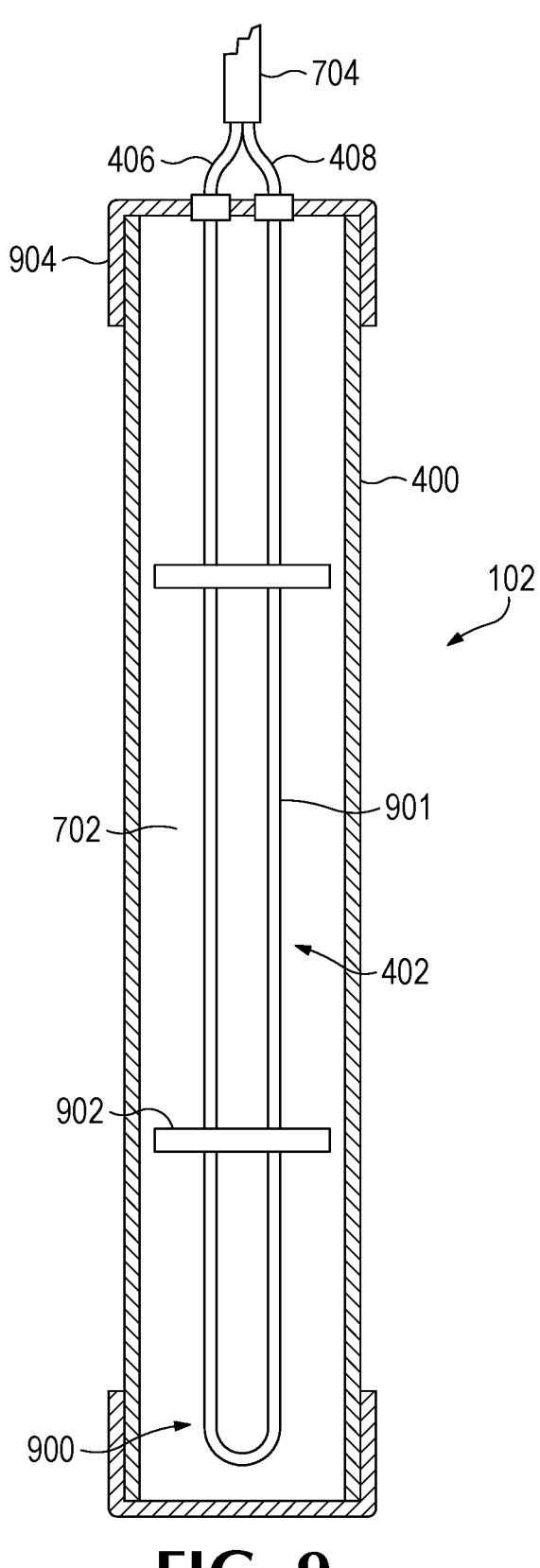
FIG. 9 depicts a side view of an example of a heater component of a low temperature thermal treatment system in accordance with an embodiment of the invention.

FIG. 9 depicts a side view of an example of a heater 102 of a low temperature thermal treatment system in accordance with an embodiment of the invention. In some example embodiments, the system for low temperature thermal treatment may be comprised of one or more heaters 102 embedded into a target volume wherein the one or more heaters 102 may be connected to a power source through a power monitoring and control system that inputs power through a power input point 406 and the current leaves the heater 102 through a power output point 408. The one or more heaters 102 might be comprised of a heating element inserted into a pipe-shaped outer casing 400. Depending on the embodiment, other suitable insulating materials 702 and configurations for electrically insulating the heating element from the sidewalls of the outer casing 400 may also be used (e.g., ceramic sleeves or beads, electrically insulating cloth sleeves, fiberglass sleeves, etc. that have suitable thermal properties). The top of the wire heating element would be connected to a suitably rated electrical supply cable 704 to power the heater 102.

In some embodiments, the heater may consist of a heater 102 constructed of a length of material 901 which may be comprised of stainless steel or nichrome wire (or other similar substance with desirable properties which may include, but is not limited to, other metals or composite materials) running down the center of the entire length or a targeted portion of an outer casing 400, which may be comprised of a material such as, but not limited to, carbon steel pipe, or directly buried in a borehole, corresponding to the desired heating interval in the subsurface. In the latter case, the heater 102 could consist of two elements, side-by-side, in the borehole or outer casing 400 and electrically connected at the bottom with a "U" shaped bend 900 or electrical junction. In other embodiments, the length of material 901 functioning as the heating component may be bent at one end in a "U" shape bend 900 such that it enters at the top of the outer casing 400 from a power input point 406, proceeding downwards, bends in a "U" shape bend 900 at some point along the length of the outer casing 900, then proceeds upward again and leaves at the power output point 408. Some embodiments may feature an alternative to the "U" shape bend 900, such as right-angled shapes, triangular ones, or other variants depending on the embodiment. Some variants of the invention may omit the outer casing 400 altogether, using just the heating components. The two elements and/or length of material 901 can, if needed for the embodiment, be electrically isolated using non-conductive insulating material 702 or spacers 902 along the entire length of the elements. Power would be applied to one leg of the element through a power input point 406 and returned by the other by the power output point 408, generating a current. Alternatively, in the pipe configuration, the top of the wire heating element could be connected to a power supply cable that then exits the top of the heater through a cap 904, or attaches to another portion of the heater through a conductive rod that is connected to the bottom of the casing. The bottom end of the heating element could then be directly and electrically connected to the bottom end cap of the heater casing or returned to the top cap by an electrically isolated, temperature rated power return cable. Power would be applied to the heater 102 through the top power supply cable, with the heater casing or the electrically isolated, temperature rated power return cable serving as the power return. In such embodiments, the two elements and/or the length of material 901 would function as the heating components 402. In some embodiments, the two elements and/or length of material may be comprised of multiple materials so the heat emanated by them along their length varies, or some portions may emanate no heat at all despite running current.

Figure 10:
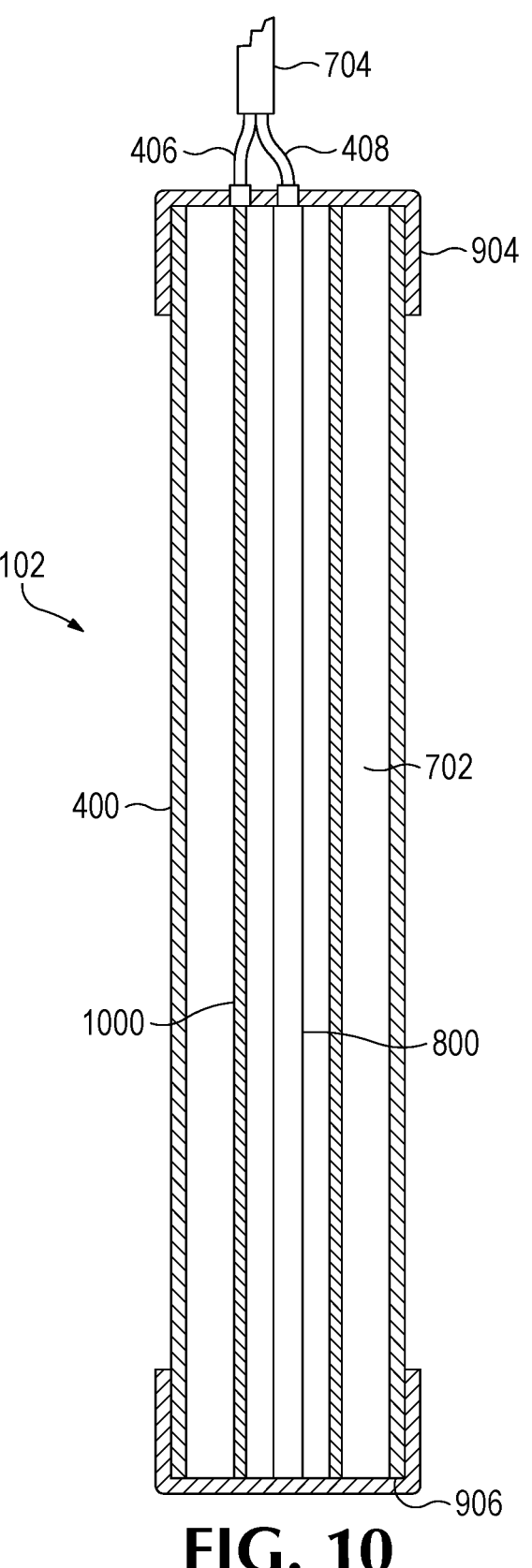
FIG. 10 depicts a side view of an example of a heater component of a low temperature thermal treatment system in accordance with an embodiment of the invention.
Figure 11:
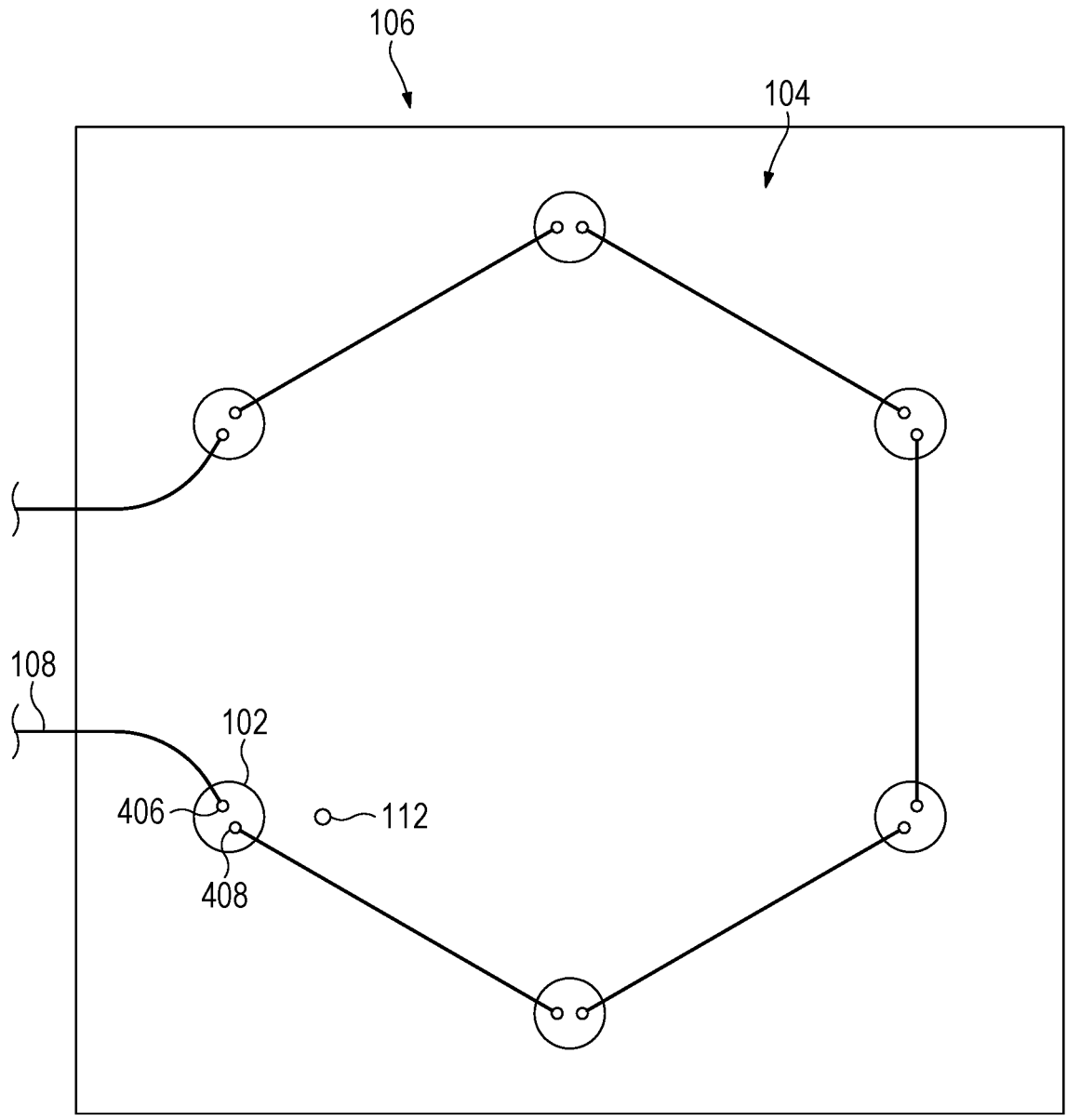
FIG. 11 depicts a top view of a heater arrangement of a low temperature thermal treatment system in accordance with an embodiment of the invention.

FIG. 10 depicts a side view of an example of a heater 102 of a low temperature thermal treatment system 100 in accordance with an embodiment of the invention. In some example embodiments, the system 100 for low temperature thermal treatment may be comprised of one or more heaters 102 embedded into a target volume 104 wherein the one or more heaters 102 may be connected to a power source through a power monitoring and control system that inputs power through a power input point 406 and the current leaves the heater 102 through a power output point 408. The one or more heaters 102 might be comprised of a heating element inserted into a pipe-shaped outer casing 400. Depending on the embodiment, other suitable insulating materials 702 and configurations for electrically insulating the heating element from the sidewalls of the outer casing 400 may also be used (e.g., ceramic sleeves or beads, electrically insulating cloth sleeves, fiberglass sleeves, etc. that have suitable thermal properties). The top of the wire heating element would be connected to a suitably rated electrical supply cable 704 to power the heater 102.

The two elements can, if needed for the embodiment, be electrically isolated using non-conductive insulating material 702 or spacers along the entire length of the elements. Power would be applied to one leg of the element through a power input point 406 and returned by the other by the power output point 408, generating a current through an inner casing 1000. Alternatively, in the pipe configuration, the top of the wire heating element could be connected to a power supply cable that then exits the top of the heater through a cap 904, or attaches to another portion of the heater through a conductive rod 800 that is connected to the bottom of the casing 906. The bottom of the casing 906 of the heating element could then be directly and electrically connected to the bottom end cap of the heater casing or returned to the top cap by an electrically isolated, temperature rated power return cable. Power would be applied to the heater 102 through the top power supply cable power input point 406, with the heater casing or the electrically isolated, temperature rated power return cable or conductive rod 800 serving as the power output point 408.

FIG. 1 depicts a top view of a heater 102 arrangement of a low temperature thermal treatment system in accordance with an embodiment of the invention. In some example embodiments, the system for low temperature thermal treatment may be comprised of one or more heaters 102 embedded into a target volume wherein the one or more heaters 102 may be connected to a power source 108 through a power monitoring and control system. The system may be further comprised of one or more temperature sensors 112 which may also be embedded into the target volume 104 of the target site 106 at one or more locations in order to gauge the temperature of the target volume 104 based on the heating from the heater units. In some embodiments, the heaters 102 may be arranged in a hexagonal pattern. The heaters 102 may be connected at their power input point 406 and power output point 408, and may be connected in series or in parallel depending on the needs of the embodiment. The exact shape of the arrangement can vary depending on the needs of the target site 106 or target volume 104, wherein the depicted figure uses a hexagonal arrangement, it might instead be square, triangular, or other shape. In some embodiments, a specific shape may be inappropriate and the heaters 102 may be positioned at targeted portions of the target site 106 or target volume 104.

Figure 12:
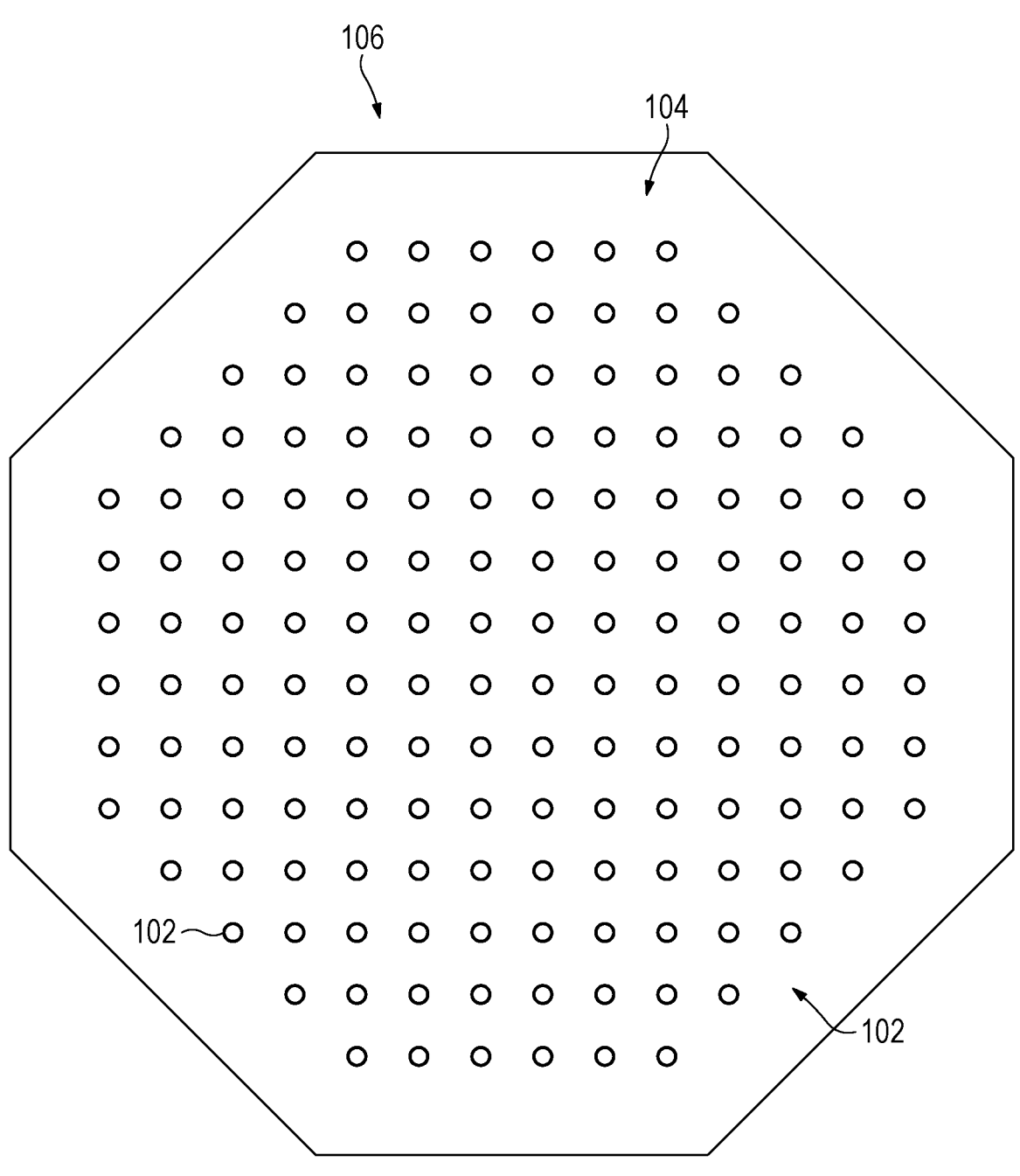
FIG. 12 depicts a top view of a heater arrangement of a low temperature thermal treatment system in accordance with an embodiment of the invention.

FIG. 12 depicts a top view of a beater 102 arrangement of a low temperature thermal treatment system in accordance with an embodiment of the invention. In some example embodiments, the system for low temperature thermal treatment may be comprised of one or more heaters 102 embedded into a target volume wherein the one or more heaters 102 may be connected to a power source through a power monitoring and control system. The system may be further comprised of one or more temperature sensors which may also be embedded into the target volume 104 of the target site 106 at one or more locations in order to gauge the temperature of the target volume 104 based on the heating from the heater units. In some embodiments, the heaters 102 may be arranged in a square pattern, but in other embodiments the pattern may be varied, including, but not limited to, triangular, circular, or irregular patterns depending on the needs of the embodiment.

Figure 13:
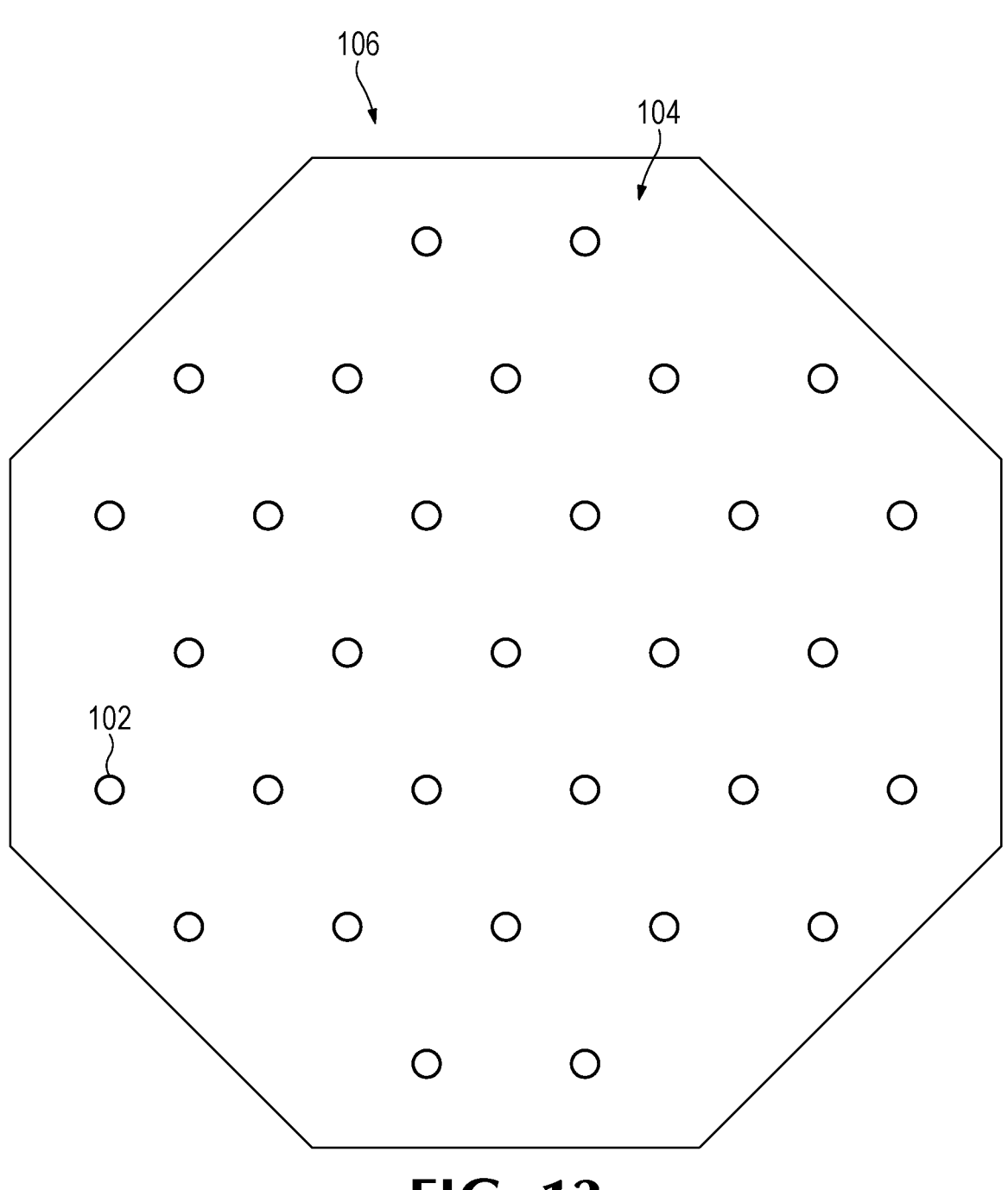
FIG. 13 depicts a top view of a heater arrangement of a low temperature thermal treatment system in accordance with an embodiment of the invention.

FIG. 13 depicts a top view of a heater 102 arrangement of a low temperature thermal treatment system in accordance with an embodiment of the invention. In some example embodiments, the system for low temperature thermal treatment may be comprised of one or more heaters 102 embedded into a target volume wherein the one or more heaters 102 may be connected to a power source through a power monitoring and control system. The system may be further comprised of one or more temperature sensors which may also be embedded into the target volume 104 of the target site 106 at one or more locations in order to gauge the temperature of the target volume 104 based on the heating from the heater units. In some embodiments, the heaters 102 may be arranged in a triangular pattern, but in other embodiments the pattern may be varied, including, but not limited to, triangular, circular, or irregular patterns depending on the needs of the embodiment.

Figure 14:
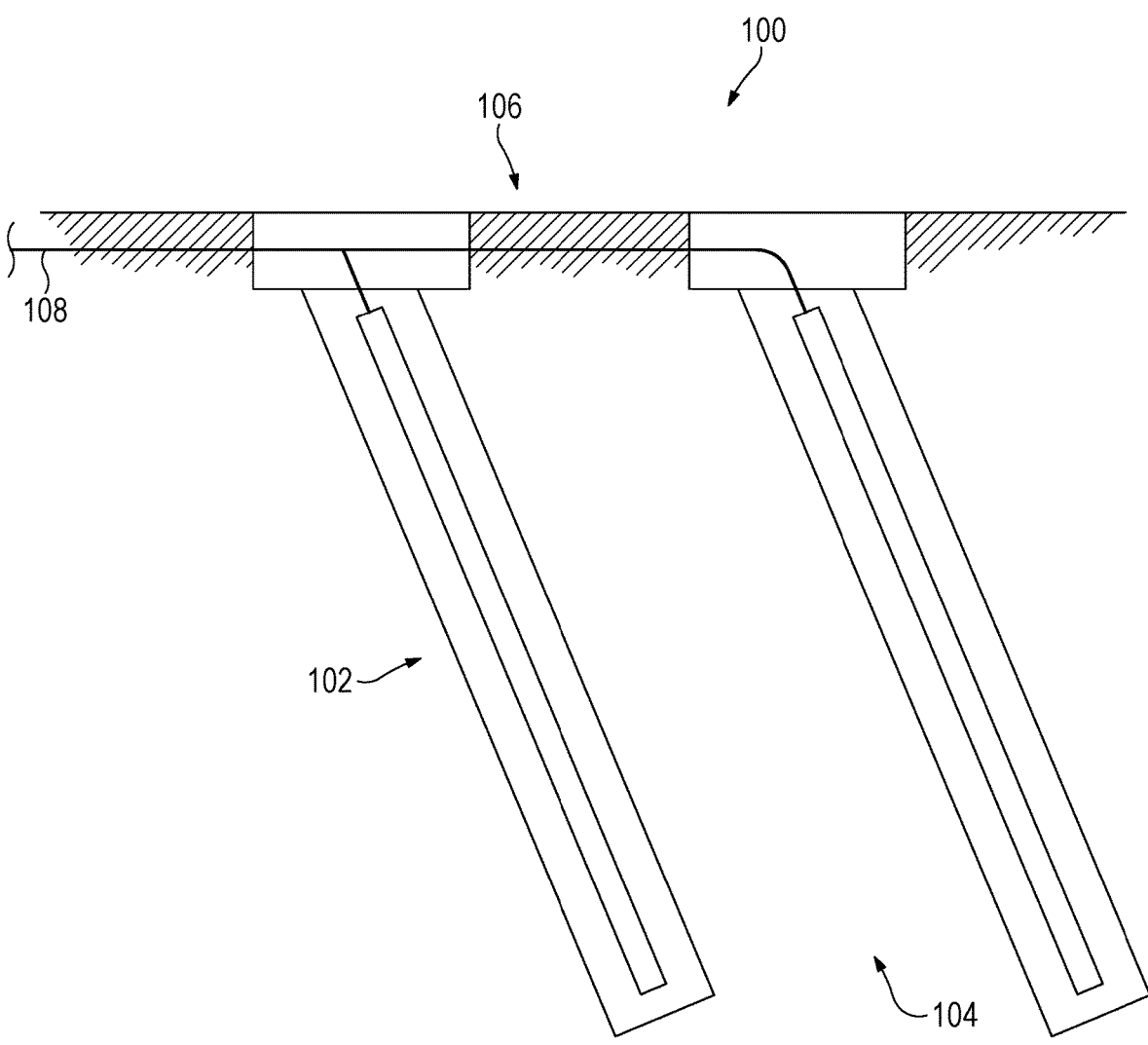
FIG. 14 depicts a side view of a heater arrangement of a low temperature thermal treatment system in accordance with an embodiment of the invention.

FIG. 14 depicts a side view of a low temperature thermal treatment system 100 in accordance with an embodiment of the invention. In some example embodiments, the system 100 for low temperature thermal treatment may be comprised of one or more heaters 102 embedded into a target volume 104 located in a target site 106 wherein the one or more heaters 102 may be connected to a power source 108 through a power monitoring and control system. In some embodiments of the invention, the one or more heaters 102 may be installed at an angle depending on the best approach to remediating the target site 106 or target volume 104.

Figure 15:
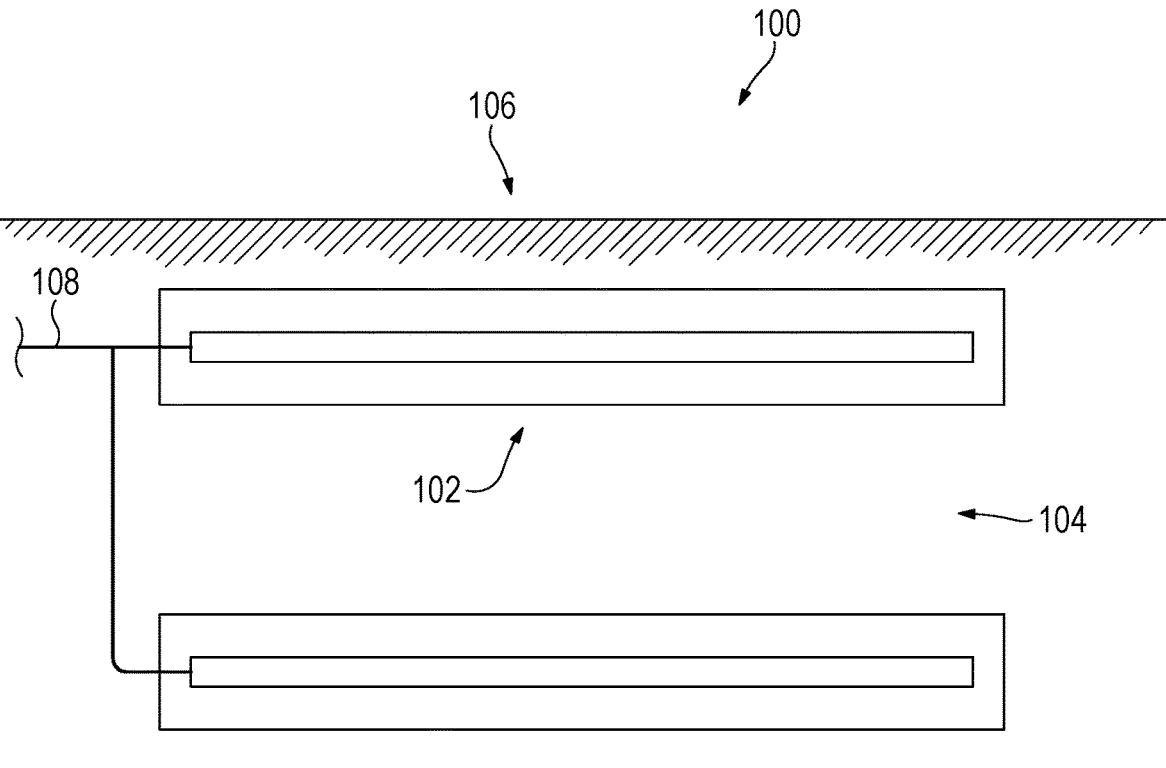
FIG. 15 depicts a side view of a heater arrangement of a low temperature thermal treatment system in accordance with an embodiment of the invention.

FIG. 15 depicts a side view of a low temperature thermal treatment system 100 in accordance with an embodiment of the invention. In some example embodiments, the system 100 for low temperature thermal treatment may be comprised of one or more heaters 102 embedded into a target volume 104 located in a target site 106 wherein the one or more heaters 102 may be connected to a power source 108 through a power monitoring and control system. In some embodiments of the invention, the one or more heaters 102 may be installed at an angle or horizontally depending on the needs of the target site 106 or target volume 104.

Figure 16:
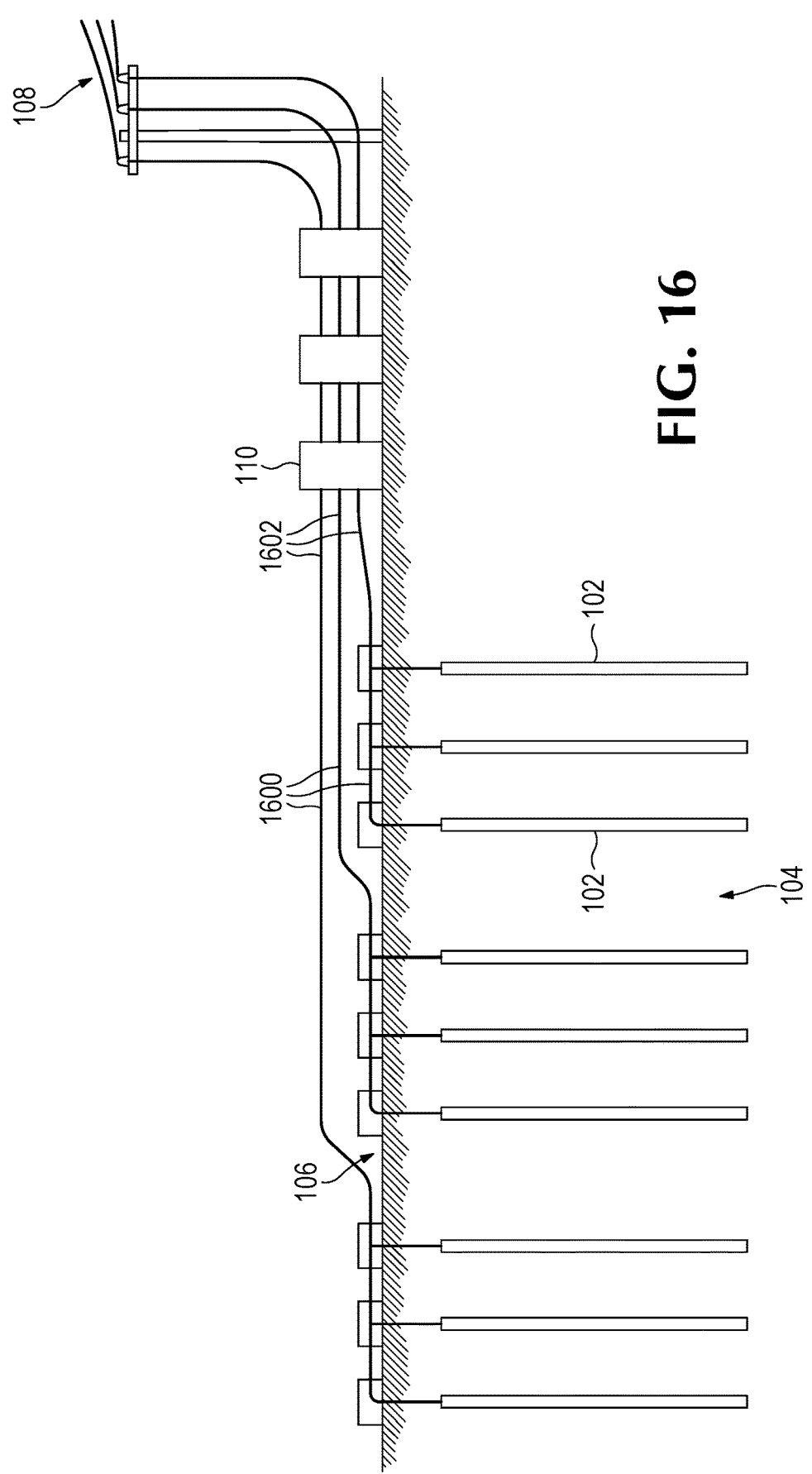
FIG. 16 depicts a side view of a low temperature thermal treatment system in accordance with an embodiment of the invention.

FIG. 16 depicts a side view of a low temperature thermal treatment system in accordance with an embodiment of the invention. As depicted in previous figures, the invention may be comprised of one or more heaters 102 connected to a power source 108 through power monitoring and control system 110. In some embodiments, one leg 1600 of a three-phase power supply (A, B, or C) would be applied to one each of three sets of heater elements through the top power supply cable 1602, with the heater casing serving as an electrode in a three-phase Electrical Resistance Heating (ERH) system. The heaters/electrodes would be arranged in triangular patterns with each triangle of heaters/electrodes consisting of A, B, and C phases. As the voltage sine waves from the three-phase power supply are sequentially applied to the A-, B-, and C-phase heaters/electrodes (each phase off-set from the next by 120°), current will flow through the heating element (A, B, or C) and then through the soil to the surrounding heater/electrodes. This embodiment of the invention then utilizes a combination of TCH and ERH to efficiently and cost-effectively heat the targeted volume 104 of the target site 106. This embodiment also decreases the cost and improves the sustainability of the invention by eliminating the need for power return cables. A network of such heaters/electrodes could be laid out and connected in a three-phase power configuration, such that each heater/electrode has neighboring heaters/electrodes of different phases (e.g., an A-phase heater/electrode is bordered by B- and C-phase heaters/electrodes).

Figure 17:
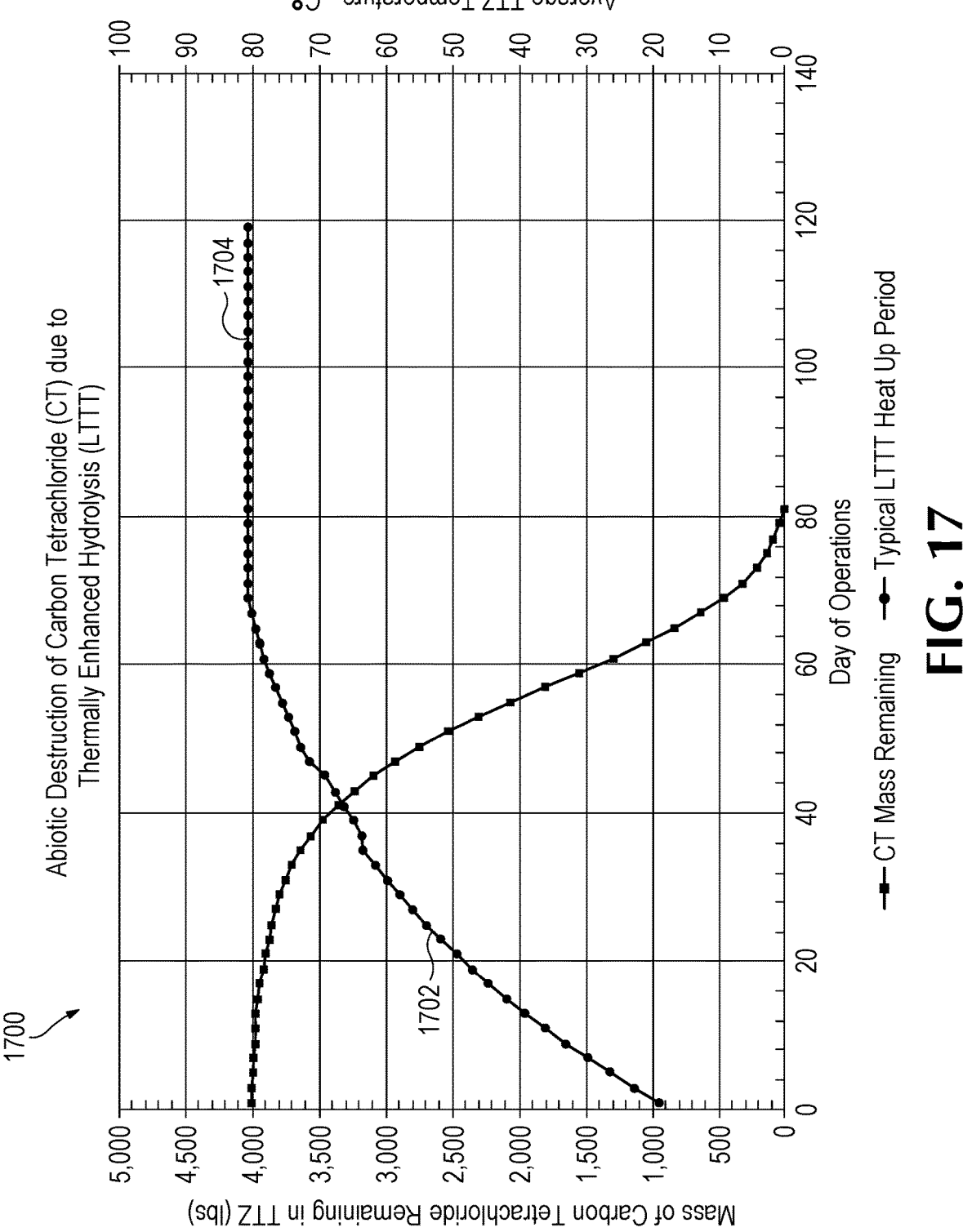
FIG. 17 depicts a graph demonstrating chemical decay of a target chemical during low temperature thermal treatment in accordance with an embodiment of the invention.

FIG. 17 depicts a graph demonstrating chemical decay of a target chemical during low temperature thermal treatment in accordance with an embodiment of the invention. The present invention utilizes low temperature heating to accelerate the degradation of contaminants in a target area, and the graph 1700) demonstrated in FIG. 17 shows an example of how that may occur with carbon tetrachloride with the mass of carbon tetrachloride 1702 and the heat of the heaters 1704 depicted showing that after 80 days the mass has been reduced from approximately 4000 lbs to zero.

Figure 18:
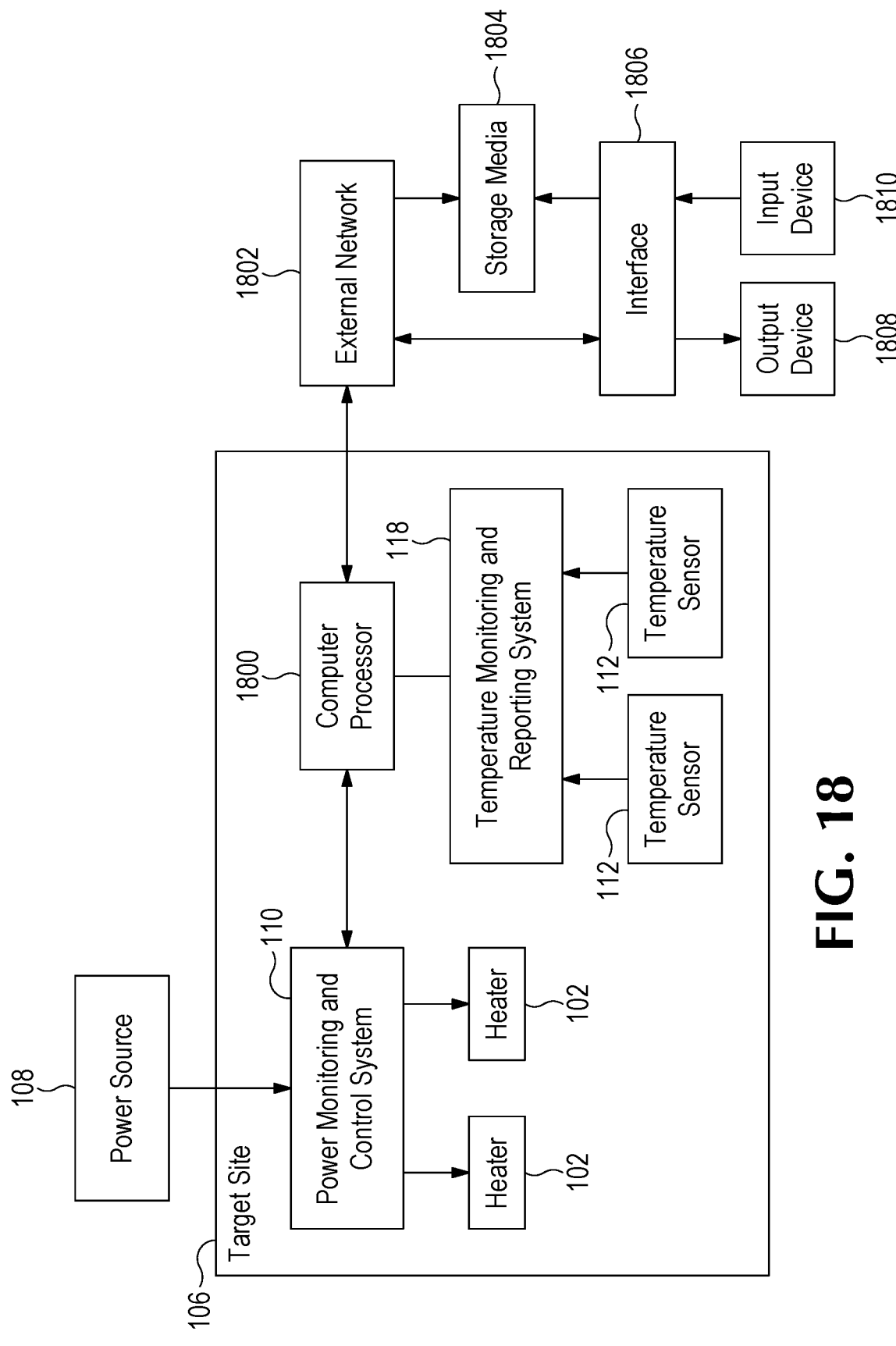
FIG. 18 depicts a system diagram showing the components and interactions of a low temperature thermal treatment system in accordance with an embodiment of the invention.

FIG. 18 depicts a system diagram showing the components and interactions of a low temperature thermal treatment system in accordance with an embodiment of the invention. The system would be comprised of a power source 108 which delivers power to the power monitoring and control system 110 which can then deliver power to the one or more heaters 102 when the system is located at or near the target site 106. The system 100 can then be controlled through a computer processor 1800 that is communicably linked to the power monitoring and control system 110 and a temperature monitoring and reporting system 118 which is connected to one or more temperature sensors 112 which can report the temperature at their location in the target site 106. In some embodiments, the computer processor 1800 is then connected to an external network 1802, which is further connected to one or more storage media 1804 where data collected by the power monitoring and control system 110 and a temperature monitoring and reporting system 118. The external network 1802 may then be connected to an interface 1806 which can allow for output devices 1808 and input devices 1810. The output devices 1808 could be comprised of devices such as, but not limited to, visual screens or data links allowing an operator to review data collected by the system 100. Similarly, the input device 1810 could be comprised of devices such as, but not limited to, keyboards and/or a mouse device, or data inputs otherwise allowing an operator to send instructions to the computer processor 1800 through the external network 1802.

Figure 19:
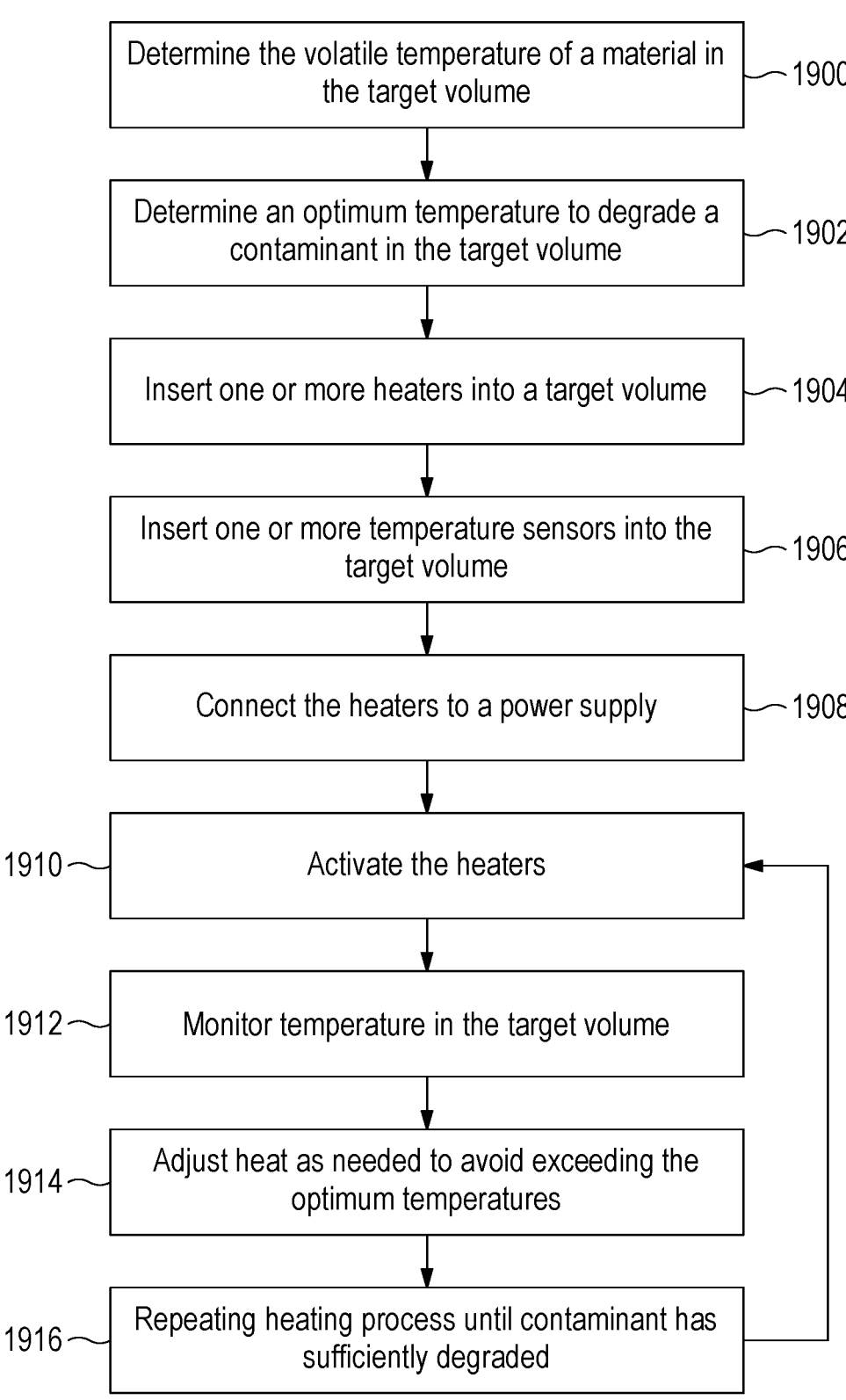
FIG. 19 shows a step-by-step chart showing the steps of the method of low temperature thermal treatment in accordance with an embodiment of the invention.

FIG. 19 shows a step-by-step chart showing the steps of the method of low temperature thermal treatment in accordance with an embodiment of the invention. In some embodiments, the low-temperature remediation of contaminants in a target volume comprised of at least one material, the method comprising: determining a volatile temperature of at least one of the materials in the target volume (step 1900); determining an optimum temperature at which a contaminant in the at least one material in the target volume's degradation will be accelerated where such optimum temperature is below the boiling point of water where the target volume is being remediated (step 1902); inserting one or more heaters into a target volume (step 1904); inserting one or more temperature sensors into one or more points in target volume wherein the one or more temperature sensors are configured to send temperature data to a central control unit (step 1906); connecting the one or more heaters to a power supply capable of delivering sufficient current and voltage to the heater and configured to be monitored from a power monitoring system (step 1908); activating the heater such that it emits heat into the target volume (step 1910); monitoring the temperature of the one or more points of the target volume (step 1912); reducing the heat emitted by the heater if the temperature of one or more points of the target volume exceeds a volatile temperature of at least one of the at least one materials in the target volume or the optimum temperature (step 1914); repeating the cycle of heating and cooling until the desired result is achieved (step 1916). The exact steps of this method may be modified depending on the exact needs of the embodiment or decontamination process, and some steps may be performed earlier or later than listed.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above." and "below" and words of similar import, when used in this application, shall refer to this application as a whole and not to any particular portions of the application.

What is claimed is:

1. A system for low-temperature remediation of a target volume comprised of at least one material, the system comprising:

a plurality of heaters, wherein the plurality of heaters are configured to connect to a power source and emit heat into their surrounding area at substantially uniform rates relatively slowly and the plurality of heaters are at least partially embedded into the target volume and wherein the plurality of heaters are configured to heat the target volume below the volatilization point of at least one contaminant but sufficient to enhance biotic and abiotic destruction or mineralization of the at least one contaminant;

a power control and monitoring system configured to deliver voltage and current to the plurality of heaters at a substantially uniform rate; and the power source wherein the power source is configured to deliver voltage and current to the power control and monitoring system for distribution.

2. The system of claim 1, the system further comprising a temperature monitoring system comprised of one or more sensors and a processing system comprised of at least one computer processor configured to receive data from the one or more sensors.

3. The system of claim 2, wherein the computer processor of the processing system is communicably linked to a data input source and is further configured to receive data from the input source.

4. The system of claim 3, the system further comprised of a computer memory communicably coupled to the computer processor and configured to store information including at least:

data received by the one or more sensors of the temperature monitoring system; data regarding volatilization temperature of at least one contaminant; and data regarding heating scheduling.

5. The system of claim 4, wherein the computer processor of the processing system is communicably linked to at least one data output configured to output data sent by the computer processor.

6. The system of claim 2, wherein the power control and monitoring station is configured to modify the current and/or voltage sent to at least one of the one or more heaters based on data received from the one or more sensors.

7. The system of claim 6, wherein there are a plurality of heaters and they are inserted into the target volume in a pattern configured to substantially maximize uniformity of heat distribution.

8. The system of claim 7, wherein the heaters are comprised of an electric input and electric output and are configured to generate heat through the electric current running through the heater from the power source.

9. The system of claim 2, wherein the target volume is located in a container or constructed pile.

10. The system of claim 9, wherein the container or pile is configured to be sealed from a surrounding area.

11. The system of claim 1, wherein the plurality of heaters generate no more than 200 watts per foot and reach no greater than 200 degrees Celsius.

12. The system of claim 11, wherein a maximum heating temperature of the plurality of heaters is configured to be below a volatility threshold of the at least one contaminant of the target volume based on the volatilization temperature of the at least one contaminant.

13. The system of claim 1, wherein the plurality of heaters are comprised of a power input, power output, and heating components.

14. The system of claim 1, wherein the target volume is located in a container.

15. A method for the low-temperature remediation of contaminants in a target volume comprised of at least one material, the method comprising:

determining a volatile temperature of at least one of the at least one material in the target volume;

determining an optimum temperature at which a contaminant in the at least one material in the target volume's degradation will be accelerated where such optimum temperature is below the boiling point of water where the target volume is being remediated;

inserting a plurality of heaters into the target volume and wherein the plurality of heaters are configured to heat the target volume below the volatilization point of at least one contaminant but sufficient to enhance biotic and abiotic destruction or mineralization of the at least one contaminant;

inserting one or more temperature sensors into one or more points in target volume wherein the one or more temperature sensors are configured to send temperature data to a central control unit;

connecting the plurality of heaters to a power supply capable of delivering sufficient current and voltage to the heater and configured to be monitored from a power monitoring system;

activating the heater such that it emits heat into the target volume;

monitoring the temperature of the one or more points of the target volume;

reducing the heat emitted by the heater if the temperature of one or more points of the target volume exceeds a volatile temperature of at least one of the at least one materials in the target volume or the optimum temperature;

deactivating the heater after a specified interval;

repeating the steps of activating the heater through reducing the heat emitted by the heater until the contaminant in the target volume have been remediated.

16. The method of claim 15, wherein a plurality of heaters are used during the inserting step and the heaters are arranged in a pattern configured to maximize uniform heat distribution of the heaters.

17. The method of claim 16, wherein the connecting step is accomplished by using at least one solar panel.

18. The method of claim 15, wherein the method comprises the additional step of determining a heating duration based on a degradation property of the contaminant of the target volume.

19. The method of claim 15, the target volume is divided into one or more sub-volumes and the steps of inserting the plurality of heaters and one or more temperature sensors are repeated in each sub-volume.

20. A system for the low-temperature remediation of a target volume comprised of at least one material, located at a location, and contaminated by at least one substance, the system comprising:

a plurality of low output, low temperature heaters, wherein the heaters are configured to connect to a power source and emit heat into their surrounding area at substantially slow, uniform rates below the boiling point of water at the location of the target volume and the plurality of heaters are substantially embedded into the target volume and arranged to provide substantial uniformity of heating throughout the target volume at an amount that will increase the degradation of the at least one substance contaminating the target volume and wherein the plurality of heaters are configured to heat the target volume below the volatilization point of at least one contaminant but sufficient to enhance biotic and abiotic destruction or mineralization of the at least one contaminant;

a power control and monitoring system configured to deliver voltage and current to the plurality of heaters at a substantially uniform rate;

the power source configured to deliver voltage and current to the power control and monitoring system for distribution;

a temperature monitoring system comprised of a plurality of temperature sensors and at least one temperature monitoring device wherein the plurality of temperature sensors are substantially embedded in the target volume at positions to ascertain a plurality of temperatures in the target volume; and a control system that is communicably coupled to the temperature monitoring system and the power control and monitoring system, wherein the control system is further configured to control the flow of power to the plurality of heaters and output data from the temperature monitoring system.

* * * * *